(12) United States Patent
Sharma et al.

(10) Patent No.: US 10,911,353 B2
(45) Date of Patent: Feb. 2, 2021

(54) ARCHITECTURE FOR A NETWORK VISIBILITY SYSTEM

(71) Applicant: Extreme Networks, Inc., San Jose, CA (US)

(72) Inventors: Shailender Sharma, Bangalore (IN); Rakesh Varimalla, Bangalore (IN); Sathya Narayana Pottimurthy, Bangalore (IN)

(73) Assignee: Extreme Networks, Inc., San Jose, CA (US)

( * ) Notice: Subject to any disclaimer, the term of this patent is extended or adjusted under 35 U.S.C. 154(b) by 858 days.

(21) Appl. No.: 14/927,479

(22) Filed: Oct. 30, 2015

(65) Prior Publication Data

US 2016/0373351 A1   Dec. 22, 2016

Related U.S. Application Data

(63) Continuation-in-part of application No. 14/848,586, filed on Sep. 9, 2015, and a continuation-in-part of application No. 14/848,645, filed on Sep. 9, 2015.

(30) Foreign Application Priority Data

Jun. 17, 2015 (IN) .......................... 3037/CHE/2015
Jun. 29, 2015 (IN) .......................... 3308/CHE/2015
(Continued)

(51) Int. Cl.
*H04L 12/741* (2013.01)
*H04L 12/715* (2013.01)
(Continued)

(52) U.S. Cl.
CPC .............. *H04L 45/74* (2013.01); *H04L 43/00* (2013.01); *H04L 45/64* (2013.01); *H04L 63/101* (2013.01)

(58) Field of Classification Search
USPC ........................................................ 370/338
See application file for complete search history.

(56) References Cited

U.S. PATENT DOCUMENTS 5,031,094 A   7/1991   Toegel et al.
5,359,593 A   10/1994  Derby et al.
(Continued)

FOREIGN PATENT DOCUMENTS

CN   101677292        3/2010
EP   2654340 A1       10/2003
(Continued)

OTHER PUBLICATIONS

International Search Report and Written Opinion, PCT Application No. PCT/US2015/012915, dated Apr. 10, 2015 pp. 1-15.
(Continued)

*Primary Examiner* — Alpus Hsu
*Assistant Examiner* — Hooman Houshmand
(74) *Attorney, Agent, or Firm* — Sterne, Kessler, Goldstein & Fox P.L.L.C.

(57) ABSTRACT

Aspects of the present disclosure provide a suitable architecture for a router controller which configures forwarding rules in a packet router of a network visibility system. In an embodiment, the router controller contains multiple controller blocks, with each controller block to examine a corresponding set of packets and to generate a respective set of forwarding rules for configuring the packet router. The router controller may also contain a switch to receive multiple packets and to forward to each controller block the corresponding set of packets. Each controller block may forward the respective set of forwarding rules to the switch, with the switch in turn configuring the packet router with the respective set of forwarding rules.

16 Claims, 15 Drawing Sheets

(30) Foreign Application Priority Data

Jun. 29, 2015 (IN) .......................... 3310/CHE/2015
Jul. 29, 2015 (IN) .......................... 3893/CHE/2015

(51) Int. Cl.
*H04L 12/26* (2006.01)
*H04L 29/06* (2006.01)

(56) References Cited

U.S. PATENT DOCUMENTS

| | | |
|---|---|---|
| 5,948,061 A | 9/1999 | Merriman et al. |
| 5,951,634 A | 9/1999 | Sitbon et al. |
| 6,006,269 A | 12/1999 | Phaal |
| 6,006,333 A | 12/1999 | Nielsen |
| 6,078,956 A | 6/2000 | Bryant et al. |
| 6,092,178 A | 7/2000 | Jindal et al. |
| 6,112,239 A | 8/2000 | Kenner et al. |
| 6,115,752 A | 9/2000 | Chauhan |
| 6,128,279 A | 10/2000 | O'Neil et al. |
| 6,128,642 A | 10/2000 | Doraswamy et al. |
| 6,148,410 A | 11/2000 | Baskey et al. |
| 6,167,445 A | 12/2000 | Gai et al. |
| 6,167,446 A | 12/2000 | Lister et al. |
| 6,182,139 B1 | 1/2001 | Brendel |
| 6,195,691 B1 | 2/2001 | Brown |
| 6,205,477 B1 | 3/2001 | Johnson et al. |
| 6,233,604 B1 | 5/2001 | Van Horne et al. |
| 6,260,070 B1 | 7/2001 | Shah |
| 6,286,039 B1 | 9/2001 | Van Horne et al. |
| 6,286,047 B1 | 9/2001 | Ramanathan et al. |
| 6,304,913 B1 | 10/2001 | Rune |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1 | 9/2002 | Shah et al. |
| 6,449,657 B2 | 9/2002 | Stanbach, Jr. et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,490,624 B1 | 12/2002 | Sampson et al. |
| 6,549,944 B1 | 4/2003 | Weinberg et al. |
| 6,567,377 B1 | 5/2003 | Vepa et al. |
| 6,578,066 B1 | 6/2003 | Logan et al. |
| 6,606,643 B1 | 8/2003 | Emens et al. |
| 6,665,702 B1 | 12/2003 | Zisapel et al. |
| 6,671,275 B1 | 12/2003 | Wong et al. |
| 6,681,232 B1 | 1/2004 | Sitanizadeh et al. |
| 6,681,323 B1 | 1/2004 | Fontsnesi et al. |
| 6,691,165 B1 | 2/2004 | Bruck et al. |
| 6,697,368 B2 | 2/2004 | Chang et al. |
| 6,735,218 B2 | 5/2004 | Chang et al. |
| 6,745,241 B1 | 6/2004 | French et al. |
| 6,751,616 B1 | 6/2004 | Chan |
| 6,754,706 B1 | 6/2004 | Swildens et al. |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,821,891 B2 | 11/2004 | Chen et al. |
| 6,826,198 B2 | 11/2004 | Turina et al. |
| 6,831,891 B2 | 12/2004 | Mansharamani et al. |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,072 B1 | 5/2005 | Wong |
| 6,901,081 B1 | 5/2005 | Ludwig |
| 6,920,498 B1 | 7/2005 | Gourlay et al. |
| 6,928,485 B1 | 8/2005 | Krishnamurthy et al. |
| 6,944,678 B2 | 9/2005 | Lu et al. |
| 6,963,914 B1 | 11/2005 | Breitbart et al. |
| 6,963,917 B1 | 11/2005 | Callis et al. |
| 6,985,956 B2 | 1/2006 | Luke et al. |
| 6,987,763 B2 | 1/2006 | Rochberger et al. |
| 6,996,615 B1 | 2/2006 | McGuire |
| 6,996,616 B1 | 2/2006 | Leighton et al. |
| 7,000,007 B1 | 2/2006 | Valenti |
| 7,009,086 B2 | 3/2006 | Brown et al. |
| 7,009,968 B2 | 3/2006 | Ambe et al. |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,031,304 B1 | 4/2006 | Arberg et al. |
| 7,032,010 B1 | 4/2006 | Swildens et al. |
| 7,036,039 B2 | 4/2006 | Holland |
| 7,058,706 B1 | 6/2006 | Iyer et al. |
| 7,058,717 B2 | 6/2006 | Chao et al. |
| 7,062,642 B1 | 6/2006 | Langrind et al. |
| 7,086,061 B1 | 8/2006 | Joshi et al. |
| 7,089,293 B2 | 8/2006 | Grosner et al. |
| 7,095,738 B1 | 8/2006 | Desanti |
| 7,117,530 B1 | 10/2006 | Lin |
| 7,126,910 B1 | 10/2006 | Sridhar |
| 7,127,713 B2 | 10/2006 | Davis et al. |
| 7,136,932 B1 | 11/2006 | Schneider |
| 7,139,242 B2 | 11/2006 | Bays |
| 7,177,933 B2 | 2/2007 | Foth |
| 7,177,943 B1 | 2/2007 | Temoshenko et al. |
| 7,185,052 B2 | 2/2007 | Day |
| 7,187,687 B1 | 3/2007 | Davis et al. |
| 7,188,189 B2 | 3/2007 | Karol et al. |
| 7,197,547 B1 | 3/2007 | Miller et al. |
| 7,206,806 B2 | 4/2007 | Pineau |
| 7,215,637 B1 | 5/2007 | Ferguson et al. |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays |
| 7,266,117 B1 | 9/2007 | Davis |
| 7,266,120 B2 | 9/2007 | Cheng et al. |
| 7,277,954 B1 | 10/2007 | Stewart et al. |
| 7,292,573 B2 | 11/2007 | LaVigne et al. |
| 7,296,088 B1 | 11/2007 | Padmanabhan et al. |
| 7,321,926 B1 | 1/2008 | Zhang et al. |
| 7,424,018 B2 | 9/2008 | Gallatin et al. |
| 7,436,832 B2 | 10/2008 | Gallatin et al. |
| 7,440,467 B2 | 10/2008 | Gallatin et al. |
| 7,441,045 B2 | 10/2008 | Skene et al. |
| 7,450,527 B2 | 11/2008 | Ashwood Smith |
| 7,454,500 B1 | 11/2008 | Hsu et al. |
| 7,483,374 B2 | 1/2009 | Nilakantan et al. |
| 7,492,713 B1 | 2/2009 | Turner et al. |
| 7,506,065 B2 | 3/2009 | LaVigne et al. |
| 7,539,134 B1 | 5/2009 | Bowes |
| 7,555,562 B2 | 6/2009 | See et al. |
| 7,558,195 B1 | 7/2009 | Kuo et al. |
| 7,574,508 B1 | 8/2009 | Kommula |
| 7,581,009 B1 | 8/2009 | Hsu et al. |
| 7,584,301 B1 | 9/2009 | Joshi |
| 7,587,487 B1 | 9/2009 | Gunturu |
| 7,606,203 B1 | 10/2009 | Shabtay et al. |
| 7,647,427 B1 | 1/2010 | Devarapalli |
| 7,657,629 B1 | 2/2010 | Kommula |
| 7,690,040 B2 | 3/2010 | Frattura et al. |
| 7,701,957 B1 | 4/2010 | Bicknell |
| 7,706,363 B1 | 4/2010 | Daniel et al. |
| 7,716,370 B1 | 5/2010 | Devarapalli |
| 7,720,066 B2 | 5/2010 | Weyman et al. |
| 7,720,076 B2 | 5/2010 | Dobbins et al. |
| 7,746,789 B2 | 6/2010 | Katoh et al. |
| 7,747,737 B1 | 6/2010 | Apte et al. |
| 7,756,965 B2 | 7/2010 | Joshi |
| 7,774,833 B1 | 8/2010 | Szeto et al. |
| 7,787,454 B1 | 8/2010 | Won et al. |
| 7,792,047 B2 | 9/2010 | Gallatin et al. |
| 7,835,348 B2 | 11/2010 | Kasralikar |
| 7,835,358 B2 | 11/2010 | Gallatin et al. |

(56) References Cited

U.S. PATENT DOCUMENTS

| | | |
|---|---|---|
| 7,840,678 B2 | 11/2010 | Joshi |
| 7,848,326 B1 | 12/2010 | Leong et al. |
| 7,889,748 B1 | 2/2011 | Leong et al. |
| 7,899,899 B2 | 3/2011 | Joshi |
| 7,940,766 B2 | 5/2011 | Olakangil et al. |
| 7,953,089 B1 | 5/2011 | Ramakrishnan et al. |
| 8,018,943 B1 | 9/2011 | Pleshek et al. |
| 8,208,494 B2 | 6/2012 | Leong |
| 8,238,344 B1 | 8/2012 | Chen et al. |
| 8,239,960 B2 | 8/2012 | Frattura et al. |
| 8,248,928 B1 | 8/2012 | Wang et al. |
| 8,270,845 B2 | 9/2012 | Cheung et al. |
| 8,315,256 B2 | 11/2012 | Leong et al. |
| 8,386,846 B2 | 2/2013 | Cheung |
| 8,391,286 B2 | 3/2013 | Gallatin et al. |
| 8,457,126 B2 | 6/2013 | Breslin et al. |
| 8,477,785 B2 | 7/2013 | Kant et al. |
| 8,504,721 B2 | 8/2013 | Hsu et al. |
| 8,514,718 B2 | 8/2013 | Zijst |
| 8,537,697 B2 | 9/2013 | Leong et al. |
| 8,570,862 B1 | 10/2013 | Leong et al. |
| 8,615,008 B2 | 12/2013 | Natarajan et al. |
| 8,654,651 B2 | 2/2014 | Leong et al. |
| 8,706,118 B2 | 4/2014 | Jaiswal et al. |
| 8,824,466 B2 | 9/2014 | Won et al. |
| 8,830,819 B2 | 9/2014 | Leong et al. |
| 8,873,557 B2 | 10/2014 | Nguyen |
| 8,891,527 B2 | 11/2014 | Wang |
| 8,897,138 B2 | 11/2014 | Yu et al. |
| 8,953,458 B2 | 2/2015 | Leong et al. |
| 9,155,075 B2 | 10/2015 | Song et al. |
| 9,264,446 B2 | 2/2016 | Goldfarb et al. |
| 9,270,566 B2 | 2/2016 | Wang et al. |
| 9,270,592 B1 | 2/2016 | Sites |
| 9,294,367 B2 | 3/2016 | Natarajan et al. |
| 9,356,866 B1 | 5/2016 | Sivaramakrishnan et al. |
| 9,380,002 B2 | 6/2016 | Johansson et al. |
| 9,479,415 B2 | 10/2016 | Natarajan et al. |
| 9,516,049 B2 | 12/2016 | Stevens et al. |
| 9,565,138 B2 | 2/2017 | Chen et al. |
| 9,648,542 B2 | 5/2017 | Hsu et al. |
| 10,057,126 B2 | 8/2018 | Vedam et al. |
| 10,129,088 B2 | 11/2018 | Sharma et al. |
| 10,243,799 B2 | 3/2019 | Chen et al. |
| 10,530,388 B2 | 1/2020 | Sharma et al. |
| 2001/0049741 A1 | 12/2001 | Skene et al. |
| 2001/0052016 A1 | 12/2001 | Skene et al. |
| 2002/0001304 A1 | 1/2002 | Johnson et al. |
| 2002/0009081 A1 | 1/2002 | Sampath et al. |
| 2002/0016856 A1* | 2/2002 | Tallegas .................. H04L 45/00 709/238 |
| 2002/0018796 A1 | 2/2002 | Wironen |
| 2002/0023089 A1 | 2/2002 | Woo |
| 2002/0026551 A1 | 2/2002 | Kamimaki et al. |
| 2002/0038360 A1 | 3/2002 | Andrews et al. |
| 2002/0055939 A1 | 5/2002 | Nardone et al. |
| 2002/0059170 A1 | 5/2002 | Vange |
| 2002/0059464 A1 | 5/2002 | Hata et al. |
| 2002/0062372 A1 | 5/2002 | Hong et al. |
| 2002/0078233 A1 | 6/2002 | Biliris et al. |
| 2002/0091840 A1 | 7/2002 | Pulier et al. |
| 2002/0105966 A1* | 8/2002 | Patel .................. H04L 47/6225 370/463 |
| 2002/0112036 A1 | 8/2002 | Bohannan et al. |
| 2002/0120743 A1 | 8/2002 | Shabtay et al. |
| 2002/0124096 A1 | 9/2002 | Loguinov et al. |
| 2002/0133601 A1 | 9/2002 | Kennamer et al. |
| 2002/0150048 A1 | 10/2002 | Ha et al. |
| 2002/0154600 A1 | 10/2002 | Ido et al. |
| 2002/0188862 A1 | 12/2002 | Trethewey et al. |
| 2002/0194324 A1 | 12/2002 | Guha |
| 2002/0194335 A1 | 12/2002 | Maynard |
| 2003/0023744 A1 | 1/2003 | Sadot et al. |
| 2003/0031185 A1 | 2/2003 | Kikuchi et al. |
| 2003/0035430 A1 | 2/2003 | Islam et al. |
| 2003/0065711 A1 | 4/2003 | Acharya et al. |
| 2003/0065763 A1 | 4/2003 | Swildens et al. |
| 2003/0086415 A1 | 5/2003 | Bernhard et al. |
| 2003/0097460 A1* | 5/2003 | Higashiyama .......... H04L 47/10 709/232 |
| 2003/0105797 A1 | 6/2003 | Dolev et al. |
| 2003/0115283 A1 | 6/2003 | Barbir et al. |
| 2003/0135509 A1 | 7/2003 | Davis et al. |
| 2003/0202511 A1 | 10/2003 | Sreejith et al. |
| 2003/0210686 A1 | 11/2003 | Terrell et al. |
| 2003/0210694 A1 | 11/2003 | Jayaraman et al. |
| 2003/0214929 A1 | 11/2003 | Bichot et al. |
| 2003/0229697 A1 | 12/2003 | Borella |
| 2004/0013112 A1* | 1/2004 | Goldberg ............ H04L 63/0254 370/389 |
| 2004/0019680 A1 | 1/2004 | Chao et al. |
| 2004/0024872 A1 | 2/2004 | Kelley et al. |
| 2004/0032868 A1 | 2/2004 | Oda et al. |
| 2004/0064577 A1 | 4/2004 | Dahlin et al. |
| 2004/0184440 A1 | 9/2004 | Higuchi et al. |
| 2004/0194102 A1 | 9/2004 | Neerdaels |
| 2004/0243718 A1 | 12/2004 | Fujiyoshi |
| 2004/0249939 A1 | 12/2004 | Amini et al. |
| 2004/0249971 A1 | 12/2004 | Klinker |
| 2005/0021883 A1 | 1/2005 | Shishizuka et al. |
| 2005/0033858 A1 | 2/2005 | Swildens et al. |
| 2005/0050136 A1* | 3/2005 | Golla .................. H04L 45/02 709/200 |
| 2005/0060418 A1 | 3/2005 | Sorokopud |
| 2005/0060427 A1 | 3/2005 | Phillips et al. |
| 2005/0068933 A1 | 3/2005 | Kokkonen et al. |
| 2005/0086295 A1 | 4/2005 | Cunningham et al. |
| 2005/0108518 A1 | 5/2005 | Pandya |
| 2005/0149531 A1 | 7/2005 | Srivastava |
| 2005/0169180 A1 | 8/2005 | Ludwig |
| 2005/0190695 A1 | 9/2005 | Phaal |
| 2005/0207417 A1 | 9/2005 | Ogawa et al. |
| 2005/0271003 A1 | 12/2005 | Devarapalli et al. |
| 2005/0278565 A1 | 12/2005 | Frattura et al. |
| 2005/0286416 A1 | 12/2005 | Shimonishi et al. |
| 2006/0036743 A1 | 2/2006 | Deng et al. |
| 2006/0039374 A1 | 2/2006 | Belz et al. |
| 2006/0045082 A1 | 3/2006 | Fertell et al. |
| 2006/0143300 A1* | 6/2006 | See .................. H04L 43/026 709/227 |
| 2006/0256721 A1* | 11/2006 | Yarlagadda ....... H04L 29/06027 370/235 |
| 2007/0044141 A1 | 2/2007 | Lor et al. |
| 2007/0053296 A1 | 3/2007 | Yazaki et al. |
| 2007/0171918 A1 | 7/2007 | Ota et al. |
| 2007/0195761 A1 | 8/2007 | Tatar et al. |
| 2007/0233891 A1 | 10/2007 | Luby et al. |
| 2008/0002591 A1 | 1/2008 | Ueno |
| 2008/0028077 A1 | 1/2008 | Kamata et al. |
| 2008/0031141 A1 | 2/2008 | Lean et al. |
| 2008/0089336 A1 | 4/2008 | Mercier et al. |
| 2008/0137660 A1 | 6/2008 | Olakangil et al. |
| 2008/0159141 A1 | 7/2008 | Soukup et al. |
| 2008/0177896 A1 | 7/2008 | Quinn et al. |
| 2008/0181119 A1 | 7/2008 | Beyers |
| 2008/0195731 A1 | 8/2008 | Harmel et al. |
| 2008/0225710 A1 | 9/2008 | Raja et al. |
| 2008/0304423 A1 | 12/2008 | Chuang et al. |
| 2009/0135835 A1 | 5/2009 | Gallatin et al. |
| 2009/0240644 A1 | 9/2009 | Boettcher et al. |
| 2009/0262741 A1 | 10/2009 | Jungck et al. |
| 2009/0262745 A1 | 10/2009 | Leong et al. |
| 2009/0323703 A1* | 12/2009 | Bragagnini ....... H04L 29/12009 370/401 |
| 2010/0011126 A1 | 1/2010 | Hsu et al. |
| 2010/0135323 A1 | 6/2010 | Leong |
| 2010/0209047 A1 | 8/2010 | Cheung et al. |
| 2010/0228974 A1 | 9/2010 | Watts et al. |
| 2010/0268761 A1* | 10/2010 | Masson .................. H04L 51/10 709/203 |
| 2010/0293293 A1* | 11/2010 | Beser .................. H04L 45/00 709/238 |
| 2010/0293296 A1 | 11/2010 | Hsu et al. |

(56) References Cited

U.S. PATENT DOCUMENTS

| | | |
|---|---|---|
| 2010/0325178 A1 | 12/2010 | Won et al. |
| 2011/0044349 A1 | 2/2011 | Gallatin et al. |
| 2011/0058566 A1 | 3/2011 | Leong et al. |
| 2011/0075675 A1* | 3/2011 | Koodli .................. H04L 12/14 370/401 |
| 2011/0134749 A1* | 6/2011 | Speks ................. G06F 11/2028 370/217 |
| 2011/0206055 A1 | 8/2011 | Leong et al. |
| 2011/0211443 A1 | 9/2011 | Leong et al. |
| 2011/0216771 A1 | 9/2011 | Gallatin et al. |
| 2011/0249682 A1 | 10/2011 | Kean et al. |
| 2011/0280149 A1 | 11/2011 | Okada et al. |
| 2011/0317678 A1 | 12/2011 | Allan et al. |
| 2012/0023340 A1 | 1/2012 | Cheung |
| 2012/0103518 A1 | 5/2012 | Kakimoto et al. |
| 2012/0155389 A1* | 6/2012 | McNamee ............ H04L 45/306 370/328 |
| 2012/0157088 A1* | 6/2012 | Gerber .................. H04L 43/12 455/423 |
| 2012/0185563 A1* | 7/2012 | Sugiyama ........... H04L 12/4641 709/217 |
| 2012/0201137 A1 | 8/2012 | Le Faucheur et al. |
| 2012/0226801 A1 | 9/2012 | Velaga et al. |
| 2012/0243533 A1 | 9/2012 | Leong |
| 2012/0257635 A1 | 10/2012 | Gallatin et al. |
| 2012/0275311 A1 | 11/2012 | Ivershen |
| 2013/0007257 A1 | 1/2013 | Ramaraj et al. |
| 2013/0010613 A1 | 1/2013 | Cafarelli et al. |
| 2013/0028072 A1 | 1/2013 | Addanki |
| 2013/0031575 A1 | 1/2013 | Gallant et al. |
| 2013/0034107 A1 | 2/2013 | Leong et al. |
| 2013/0124707 A1 | 5/2013 | Ananthapadmanabha et al. |
| 2013/0151686 A1* | 6/2013 | Takaoka .............. H04L 41/0816 709/223 |
| 2013/0156029 A1 | 6/2013 | Gallatin et al. |
| 2013/0173784 A1 | 7/2013 | Wang et al. |
| 2013/0201984 A1 | 8/2013 | Wang |
| 2013/0259037 A1 | 10/2013 | Natarajan et al. |
| 2013/0272135 A1 | 10/2013 | Leong |
| 2013/0272136 A1 | 10/2013 | Ali et al. |
| 2013/0318243 A1 | 11/2013 | Chinthalapati et al. |
| 2013/0322236 A1 | 12/2013 | Bahadur et al. |
| 2014/0016500 A1 | 1/2014 | Leong et al. |
| 2014/0022916 A1 | 1/2014 | Natarajan et al. |
| 2014/0029451 A1 | 1/2014 | Nguyen |
| 2014/0036918 A1 | 2/2014 | Varvello et al. |
| 2014/0040478 A1 | 2/2014 | Hsu et al. |
| 2014/0086097 A1 | 3/2014 | Qu et al. |
| 2014/0101297 A1 | 4/2014 | Neisinger et al. |
| 2014/0204747 A1 | 7/2014 | Yu et al. |
| 2014/0219100 A1 | 8/2014 | Pandey et al. |
| 2014/0233399 A1 | 8/2014 | Mann et al. |
| 2014/0321278 A1 | 10/2014 | Cafarelli et al. |
| 2014/0372616 A1 | 12/2014 | Arisoylu |
| 2015/0009828 A1 | 1/2015 | Murakami |
| 2015/0009830 A1 | 1/2015 | Bisht et al. |
| 2015/0023176 A1 | 1/2015 | Koija et al. |
| 2015/0033169 A1 | 1/2015 | Lection et al. |
| 2015/0055640 A1 | 2/2015 | Wang et al. |
| 2015/0071171 A1 | 3/2015 | Akiyoshi |
| 2015/0103824 A1 | 4/2015 | Tanabe |
| 2015/0113132 A1 | 4/2015 | Srinivas et al. |
| 2015/0124622 A1 | 5/2015 | Kovvali et al. |
| 2015/0142935 A1 | 5/2015 | Srinivas et al. |
| 2015/0170920 A1 | 6/2015 | Purayath et al. |
| 2015/0172219 A1 | 6/2015 | Johansson et al. |
| 2015/0180802 A1 | 6/2015 | Chen et al. |
| 2015/0195192 A1 | 7/2015 | Vasseur et al. |
| 2015/0207905 A1 | 7/2015 | Merchant et al. |
| 2015/0215841 A1 | 7/2015 | Hsu et al. |
| 2015/0256436 A1 | 9/2015 | Stoyanov et al. |
| 2015/0263889 A1 | 9/2015 | Newton |
| 2015/0281125 A1 | 10/2015 | Koponen et al. |
| 2015/0319070 A1 | 11/2015 | Nachum |
| 2015/0326532 A1 | 11/2015 | Grant et al. |
| 2016/0036620 A1 | 2/2016 | Dunbar et al. |
| 2016/0119234 A1 | 4/2016 | Valencia Lopez et al. |
| 2016/0149811 A1 | 5/2016 | Roch et al. |
| 2016/0164768 A1 | 6/2016 | Natarajan et al. |
| 2016/0182329 A1 | 6/2016 | Armolavicius et al. |
| 2016/0182378 A1 | 6/2016 | Basavaraja et al. |
| 2016/0204996 A1 | 7/2016 | Lindgren et al. |
| 2016/0226725 A1 | 8/2016 | Iizuka et al. |
| 2016/0248655 A1 | 8/2016 | Francisco et al. |
| 2016/0285735 A1 | 9/2016 | Chen et al. |
| 2016/0285762 A1 | 9/2016 | Chen et al. |
| 2016/0285763 A1 | 9/2016 | Laxman et al. |
| 2016/0308766 A1 | 10/2016 | Register et al. |
| 2016/0373303 A1 | 12/2016 | Vedam et al. |
| 2016/0373304 A1 | 12/2016 | Sharma et al. |
| 2016/0373352 A1 | 12/2016 | Sharma et al. |
| 2017/0099224 A1 | 4/2017 | O'Connor et al. |
| 2017/0118102 A1 | 4/2017 | Majumder et al. |
| 2017/0187649 A1 | 6/2017 | Chen et al. |
| 2017/0237632 A1 | 8/2017 | Hegde et al. |
| 2017/0237633 A1 | 8/2017 | Hegde et al. |
| 2017/0279723 A1 | 9/2017 | Vedam et al. |
| 2017/0339022 A1 | 11/2017 | Hedge et al. |
| 2018/0109433 A1 | 4/2018 | Nagaraj et al. |
| 2019/0082342 A1 | 3/2019 | Sharma et al. |

FOREIGN PATENT DOCUMENTS

| | | |
|---|---|---|
| EP | 2654340 A1 | 10/2013 |
| EP | 3206344 A2 | 8/2017 |
| EP | 3206345 A2 | 8/2017 |
| IE | 20070438 A1 | 2/2008 |
| IN | 201641010295 | 3/2016 |
| IN | 201641016960 | 5/2016 |
| IN | 201641035761 | 10/2016 |
| WO | 2010135474 A | 11/2010 |
| WO | 2010135474 A1 | 11/2010 |
| WO | 2015116538 A1 | 8/2015 |
| WO | 2015138513 A1 | 9/2015 |

OTHER PUBLICATIONS

Creating a Visibility Architecture, https://www.google.co.in/url?sa=t&rct=j&q=&esrc=s&source=web&cd=1&ved=0ahUKEwjOxtz-v-jMAhVDGJQKHR9CBN0QFggcMAA&url=http%3A%2F%2Fwww.ipexpoeurope.com%2Fcontent%2Fdownload%2F6328%2F76450%2Ffile%2FCreating-a-Visibility-Architecture-1.pdf&usg=AFQjCNE_2F7FM3ktZFcUfMgUD9CaG-Hb3A&cad=rja, date Feb. 2014, p. 1-14.

Unified Visibility Fabric from Gigamon, https://www.gigamon.com/unified-visibility-fabric, downloaded circa Apr. 7, 2015, p. 1-5.

ExtraHop-Arista Persistent Monitoring Architecture for SDN, downloaded circa Apr. 2, 2015, pp. 1-5.

7433 GTP Session Controller, www.ixia.com, downloaded circa Apr. 2, 2015, pp. 1-3.

U.S. Appl. No. 14/320,138, Notice of Allowance dated Sep. 23, 2016, 17 pages.

Gigamon: Unified Visibility Fabric Solution Brief; 3018-03; Jan. 2015; 4 pages.

Gigamon: Active Visibility for Multi-Tiered Security Solutions Overview; 3127-02; Oct. 2014; 5 pages.

Gigamon: Enabling Network Monitoring at 40Gbps and 100Gbps with Flow Mapping Technology White Paper; 2012; 4 pages.

Gigamon: Enterprise System Reference Architecture for the Visibility Fabric White Paper; 5005-03; Oct. 2014; 13 pages.

Gigamon: Gigamon Intelligent Flow Mapping White Paper; 3039-02; Aug. 2013; 7 pages.

Gigamon: Maintaining 3G and 4G LTE Quality of Service White Paper; 2012; 4 pages.

Gigamon: Monitoring, Managing, and Securing SDN Deployments White Paper; 3106-01; May 2014; 7 pages.

Gigamon: Service Provider System Reference Architecture for the Visibility Fabric White Paper; 5004-01; Mar. 2014; 11 pages.

(56) References Cited

OTHER PUBLICATIONS

Gigamon: Unified Visibility Fabric—A New Approach to Visibility White Paper; 3072-04; Jan. 2015; 6 pages.
Gigamon: The Visibility Fabric Architecture—A New Approach to Traffic Visibility White Paper; 2012-2013; 8 pages.
Ixia: Creating a Visibility Architecture—a New Perspective on Network Visibilty White Paper; 915-6581-01 Rev. A, Feb. 2014; 14 pages.
Gigamon: Unified Visibility Fabric; https://www.gigamon.com/unfied-visibility-fabric; Apr. 7, 2015; 5 pages.
Gigamon: Application Note Stateful GTP Correlation; 4025-02; Dec. 2013; 9 pages.
Brocade and IBM Real-Time Network Analysis Solution; 2011 Brocade Communications Systems, Inc.; 2 pages.
Ixia Anue GTP Session Controller; Solution Brief; 915-6606-01 Rev. A, Sep. 2013; 2 pages.
Netscout; Comprehensive Core-to-Access IP Session Analysis for GPRS and UMTS Networks; Technical Brief; Jul. 16, 2010; 6 pages.
Netscout: nGenius Subscriber Intelligence; Data Sheet; SPDS_001-12; 2012; 6 pages.
Gigamon: Visibility Fabric Architecture Solution Brief; 2012-2013; 2 pages.
Gigamon: Visibility Fabric; More than Tap and Aggregation.bmp; 2014; 1 page.
Ntop: Monitoring Mobile Networks (2G, 3G and LTE) using nProbe; http://www.ntop.org/nprobe/monitoring-mobile-networks-2g-3g-and-lte-using-nprobe; Apr. 2, 2015; 4 pages.
Gigamon: GigaVUE-HB1 Data Sheet; 4011-07; Oct. 2014; 4 pages.
Brocade IP Network Leadership Technology; Enabling Non-Stop Networking for Stackable Switches with Hitless Failover; 2010; 3 pages.
Gigamon: Adaptive Packet Filtering; Feature Brief; 3098-03 Apr. 2015; 3 pages.
Delgadillo, "Cisco Distributed Director", White Paper, 1999, at URL:http://www-europe.cisco.warp/public/751/distdir/dd_wp.htm, (19 pages) with Table of Contents for TeleCon (16 pages).
Cisco LocalDirector Version 1.6.3 Release Notes, Oct. 1997, Cisco Systems, Inc. Doc No. 78-3880-05.
"Foundry Networks Announces Application Aware Layer 7 Switching on ServerIron Platform," (Mar. 1999).
Foundry ServerIron Installation and Configuration Guide (May 2000), Table of Contents—Chapter 1-5, http://web.archive.org/web/20000815085849/http://www.foundrynetworks.com/techdocs/SI/index.html.
Foundry ServerIron Installation and Configuration Guide (May 2000), Chapter 6-10, http://web.archive.org/web/20000815085849/http://www.foundrynetworks.com/techdocs/SI/index.html.
Foundry ServerIron Installation and Configuration Guide (May 2000), Chapter 11—Appendix C, http://web.archive.org/web/20000815085849/http://www.foundrynetworks.com/techdocs/SI/index.html.
NGenius Subscriber Intelligence, http://www.netscout.com/uploads/2015/03NetScout_DS_Subscriber_intelligence_SP.pdf, downloaded circa Mar. 23, 2015, pp. 1-6.
Xu et al.: Cellular Data Network Infrastructure Characterization and Implication on Mobile Content Placement, Sigmetrics '11 Proceedings of the ACM SIGMETRICS joint international conference on Measurement and modeling of computer systems, date Jun. 7-11, 2011, pp. 1-12, ISBN: 978-1-4503-0814-4 ACM New York, NY, USA copyright 2011.
E.H.T.B. Brands, Flow-Based Monitoring of GTP Trac in Cellular Networks, Date: Jul. 20, 2012, pp. 1-64, University of Twente, Enschede, The Netherlands.
Qosmos DeepFlow: Subscriber Analytics Use Case, http://www.qosmos.com/wp-content/uploads/2014/01/Qosmos-DeepFlow-Analytics-use-case-datasheet-Jan-2014.pdf, date Jan. 2014, pp. 1-2.
Configuring GTM to determine packet gateway health and availability, https://support.f5.com/kb/en-us/products/big-ip_gtm/manuals/product/gtm-implementations-11-6-0/9.html, downloaded circa Mar. 23, 2015, pp. 1-5.
Stateful GTP Correlation, https://www.gigamon.com/PDF/appnote/AN-GTP-Correlation-Stateful-Subscriber-Aware-Filtering-4025.pdf, date 2013, pp. 1-9.
GigaVUE-2404 // Data Sheet, www.gigamon.com, date Feb. 2014, pp. 1-6.
NGenius Performance Manager, www.netscout.com, date Mar. 2014, pp. 1-8.
GigaVUE-VM // Data Sheet, www.gigamon.com, date Oct. 2014, pp. 1-3.
Unified Visibility Fabric an Innovative Approach, https://www.gigamon.com/unified-visibility-fabric, Downloaded circa Mar. 30, 2015, pp. 1-4.
Adaptiv.io and Apsalar Form Strategic Partnership to Provide Omni-channel Mobile Data Intelligence, http://www.businesswire.com/news/home/20150113005721/en/adaptiv.io-Apsalar-Form-Strategic-Partnership-Provide-Omni-channel, Downloaded circa Mar. 30, 2015, pp. 1-2.
Real-time Data Analytics with IBM InfoSphere Streams and Brocade MLXe Series Devices, www.brocade.com, date 2011, pp. 1-2.
Syniverse Proactive Roaming Data Analysis—VisProactive, http://m.syniverse.com/files/service_solutions/pdf/solutionsheet_visproactive_314.pdf.,date 2014, pp. 1-3.
Network Analytics: Product Overview, www.sandvine.com, date Apr. 28, 2014, pp. 1-2.
Notice of Allowance for U.S. Appl. No. 13/584,534 dated Jan. 6, 2016, 4 pages.
U.S. Appl. No. 12/272,618, Final Office Action dated May 5, 2014, 13 pages.
U.S. Appl. No. 12/272,618, NonFinal Office Action dated Jul. 29, 2013, 13 pages.
U.S. Appl. No. 12/272,618, NonFinal Office Action dated Jan. 12, 2015, 5 pages.
U.S. Appl. No. 12/272,618, Notice of Allowance dated Aug. 26, 2015, 11 pages.
U.S. Appl. No. 15/205,889, filed Jul. 8, 2016 by Hegde et al.
U.S. Appl. No. 15/206,008, filed Jul. 8, 2016 by Hegde et al.
U.S. Appl. No. 14/603,304, NonFinal Office Action dated Aug. 1, 2016, 86 pages.
U.S. Appl. No. 12/272,618, Final Office Action dated Feb. 28, 2012, 12 pages.
U.S. Appl. No. 13/925,670, NonFinal Office Action dated Nov. 16, 2015, 48 pages.
U.S. Appl. No. 14/230,590, Notice of Allowance dated Sep. 23, 2015, 8 pages.
U.S. Appl. No. 15/043,421, Notice of Allowance dated Jun. 27, 2016, 21 pages.
U.S. Appl. No. 14/927,484, NonFinal Office Action dated Aug. 9, 2017, 77 pages.
U.S. Appl. No. 14/848,677, Notice of Allowance dated Aug. 28, 2017, 31 pages.
U.S. Appl. No. 15/466,732, filed Mar. 22, 2017 by Hegde et al.
U.S. Appl. No. 15/467,766, filed Mar. 23, 2017 by Nagaraj et al.
U.S. Appl. No. 15/425,777, filed Feb. 6, 2017, by Chen et al.
Joshi et al.: A Review of Network Traffic Analysis and Prediction Techniques; arxiv.org; 2015; 22 pages.
Anjali et al.: MABE: A New Method for Available Bandwidth Estimation in an MPLS Network; submitted to World Scientific on Jun. 5, 2002; 12 pages.
Cisco Nexus Data Broker: Scalable and Cost-Effective Solution for Network Traffic Visibility; Cisco 2015; 10 pages.
VB220-240G Modular 10G/1G Network Packet Broker; VSS Monitoring; 2016, 3 pages.
Big Tap Monitoring Fabric 45; Big Switch Networks; Apr. 2015; 8 pages.
Gigamon Intelligent Flow Mapping—Whitepaper; 3039-04; Apr. 2015; 5 pages.
Ixia White Paper; The Real Secret to Securing Your Network; Oct. 2014; 16 pages.
Accedian—Solution Brief; FlowBROKER; Feb. 2016; 9 pages.

(56) References Cited

OTHER PUBLICATIONS

Network Time Machine for Service Providers; NETSCOUT; http://enterprise.netscout.com/telecom-tools/lte-solutions/network-time-machine-service-providers; Apr. 18, 2017; 8 pages.
Arista EOS Central—Introduction to TAP aggregation; https://eos.arista.com/introduction-to-tap-aggregation/; Apr. 18, 2017; 6 pages.
Brocade Session Director—Data Sheet; 2016; https://www.brocade.com/content/dam/common/documents/content-types/datasheet/brocade-session-director-ds.pdf; 5 pages.
Ixia—Evaluating Inline Security Fabric: Key Considerations; White Paper; https://www.ixiacom.com/sites/default/files/2016-08/915-8079-01-S-WP-Evaluating%20Inline%20Security%20Fabric_v5.pdf; 10 pages.
Next-Generation Monitoring Fabrics for Mobile Networks; Big Switch Networks—White Paper; 2014; 9 pages.
Gigamon Adaptive Packet Filtering; Jan. 25, 2017; 3 pages.
VB220 Modular 10G.1G Network Packet Broker Datasheet; VSS Monitoring; 2016; 8 pages.
FlexaWare; FlexaMiner Packet Filter FM800PF; Jan. 27, 2017; 5 pages.
GL Communications Inc.; PacketBroker—Passive Ethernet Tap; Jan. 27, 2017; 2 pages.
International Search Report & Written Opinion for PCT Application PCT/US2017/025998 dated Jul. 20, 2017, 8 pages.
Ixia & VECTRA, Complete Visibility for a Stronger Advanced Persistent Threat (APT) Defense, pp. 1-2, May 30, 2016.
Extended European Search Report & Opinion for EP Application 17000212.5 dated Aug. 1, 2017, 9 pages.
Extended European Search Report & Opinion for EP Application 17000213.3 dated Aug. 1, 2017, 7 pages.
U.S. Appl. No. 15/336,333, filed Oct. 27, 2016 by Vedam et al.
U.S. Appl. No. 14/603,304, Notice of Allowance dated Jan. 11, 2017, 13 pages.
U.S. Appl. No. 14/848,677, NonFinal Office Action dated Feb. 10, 2017, 83 pages.
Krishnan et al.: "Mechanisms for Optimizing LAG/ECMP Component Link Utilization in Networks", Oct. 7, 2014, 27 pages, https://tools.ietf.org/html/draft-ietf-opsawg-large-flow-load-balancing-15.
U.S. Appl. No. 61/919,244, filed Dec. 20, 2013 by Chen et al.
U.S. Appl. No. 61/932,650, filed Jan. 28, 2014 by Munshi et al.
U.S. Appl. No. 61/994,693, filed May 16, 2014 by Munshi et al.
U.S. Appl. No. 62/088,434, filed Dec. 5, 2014 by Hsu et al.
U.S. Appl. No. 62/137,073, filed Mar. 23, 2015 by Chen et al.
U.S. Appl. No. 62/137,084, filed Mar. 23, 2015 by Chen et al.
U.S. Appl. No. 62/137,096, filed Mar. 23, 2015 by Laxman et al.
U.S. Appl. No. 62/137,106, filed Mar. 23, 2015 by Laxman et al.
U.S. Appl. No. 60/998,410, filed Oct. 9, 2007 by Wang et al.
U.S. Appl. No. 60/169,502, filed Dec. 7, 2009 by Yeejang James Lin.
U.S. Appl. No. 60/182,812, filed Feb. 16, 2000 by Skene et al.
Gigamon: Netflow Generation Feature Brief; 3099-04; Oct. 2014; 2 pages.
U.S. Appl. No. 14/320,138, filed Jun. 30, 2014 by Chen et al.
U.S. Appl. No. 14/603,304, filed Jan. 22, 2015 by Hsu et al.
U.S. Appl. No. 14/848,586, filed Sep. 9, 2015 by Chen et al.
U.S. Appl. No. 14/848,645, filed Sep. 9, 2015 by Chen et al.
U.S. Appl. No. 14/848,677, filed Sep. 9, 2015 by Laxman et al.
U.S. Appl. No. 09/459,815, filed Dec. 13, 1999 by Skene et al.
U.S. Appl. No. 14/927,478, filed Oct. 30, 2015 by Vedam et al.
Gigamon: Vistapointe Technology Solution Brief; Visualize-Optimize-Monetize-3100-02; Feb. 2014; 2 pages.
U.S. Appl. No. 14/927,482, filed Oct. 30, 2015 by Sharma et al.
U.S. Appl. No. 14/927,484, filed Oct. 30, 2015 by Sharma et al.
Non-Final Office Action for U.S. Appl. No. 11/827,524 dated Dec. 10, 2009, 15 pages.
Non-Final Office Action for U.S. Appl. No. 11/827,524 dated Jun. 2, 2010, 14 pages.
Non-Final Office Action for U.S. Appl. No. 11/827,524 dated Nov. 26, 2010, 16 pages.
Final Office Action for U.S. Appl. No. 11/827,524 dated May 6, 2011, 19 pages.
Advisory Action for U.S. Appl. No. 11/827,524 dated Jul. 14, 2011, 5 pages.
Non-Final Office Action for U.S. Appl. No. 11/827,524 dated Oct. 18, 2012, 24 pages.
Notice of Allowance for U.S. Appl. No. 11/827,524 dated Jun. 25, 2013, 11 pages.
Non-Final Office Action for U.S. Appl. No. 14/030,782 dated Oct. 6, 2014, 14 pages.
Non-Final Office Action for U.S. Appl. No. 13/584,534 dated Oct. 24, 2014, 24 pages.
Restriction Requirement for U.S. Appl. No. 13/584,534 dated Jul. 21, 2014, 5 pages.
Non-Final Office Action for U.S. Appl. No. 11/937,285 dated Jul. 6, 2009, 28 pages.
Final Office Action for U.S. Appl. No. 11/937,285 dated Mar. 3, 2010, 28 pages.
Non-Final Office Action for U.S. Appl. No. 11/937,285 dated Aug. 17, 2010, 28 pages.
Final Office Action for U.S. Appl. No. 11/937,285 dated Jan. 20, 2011, 41 pages.
Final Office Action for U.S. Appl. No. 11/937,285 dated May 20, 2011, 37 pages.
Non-Final Office Action for U.S. Appl. No. 11/937,285 dated Nov. 28, 2011, 40 pages.
Notice of Allowance for U.S. Appl. No. 11/937,285 dated Jun. 5, 2012, 10 pages.
Final Office Action for U.S. Appl. No. 14/030,782 dated Jul. 29, 2015, 14 pages.
Final Office Action for U.S. Appl. No. 13/584,534 dated Jun. 25, 2015, 21 pages.
Notice of Allowance for U.S. Appl. No. 14/030,782 dated Nov. 16, 2015, 20 pages.
Notice of Allowance for U.S. Appl. No. 13/584,534 dated Dec. 16, 2015, 7 pages.
Non-Final Office Action for U.S. Appl. No. 14/320,138 dated Feb. 2, 2016, 30 pages.
Non-Final Office Action for U.S. Appl. No. 15/043,421 dated Apr. 13, 2016, 18 pages.
IBM User Guide, Version 2.1AIX, Solaris and Windows NT, Third Edition (Mar. 1999) 102 Pages.
White Paper, Foundry Networks, "Server Load Balancing in Today's Web-Enabled Enterprises" Apr. 2002 10 Pages.
International Search Report & Written Opinion for PCT Application PCT/US2015/012915 dated Apr. 10, 2015, 15 pages.
PCT Patent Application No. PCT/US2015/012915 filed on Jan. 26, 2015 by Hsu et al.
Network Visibility and Analytics Service. Administration Guide; Brocade; Dec. 19, 2014.
Mobile Network Visibility Solution: Feature Specification and Design Implementation; Brocade; Mar. 2014; 46 pages.
GTP Visibility 3G/4G GPRS/GTP Reference Guide; Mar. 12, 2014; 8 pages.
GTP Visibility Architecture; Brocade; Mar. 15, 2014; 17 pages.
GTP Visibility Communication Protocol (GVCP) Specification; Brocade; Oct. 6, 2014; 32 pages.
Network Visibility and Analytics TOI; Brocade; Dec. 2014; 126 pages.

* cited by examiner

FIG. 6A

| Input Port 650 | Source IP Address 651 | Destination IP Address 652 | VLAN ID 653 | Service Instance ID 654 | Whitelist Port 655 |
|---|---|---|---|---|---|
| 120-1 | * | SGWIP1 | IV1 | 506A | WP1 |
| 120-2 | SGWIP2 | * | IV2 | 506B | WP1 |

| Destination IP Address 660 | Source IP Address 661 | Protocol 662 | L4 Source Port 663 | L4 Destination Port 664 | Output Port 665 | VLAN ID 666 |
|---|---|---|---|---|---|---|
| Server1 | UE1 | IP | SP563 | DP200 | 130-1 | IV4 |
| UE2 | Server2 | IP | SP184 | DP112 | 130-2 | IV5 |

| Source IP Address 670 | Destination IP Address 671 | Action 672 |
|---|---|---|
| Server4 | UE5 | Drop |
| UE7 | Server5 | Drop |

| Source IP Address 680 | Destination IP Address 681 | Output Port 682 |
|---|---|---|
| * | SGWIP1 | 130-1 |
| SGWIP1 | * | 130-1 |
| * | SGWIP2 | 130-2 |
| SGWIP2 | * | 130-2 |

| Source IP Address 690 | Destination IP Address 691 | Tunnel Endpoint Identifier (TEID) 692 | Output Port 693 |
|---|---|---|---|
| * | ENBIP1 | TEID3 | 130-1 |
| * | SGWIP2 | TEID4 | 130-1 |
| * | ENBIP1 | TEID5 | 130-1 |
| * | SGWIP2 | TEID6 | 130-1 |

584
640
641
642
643

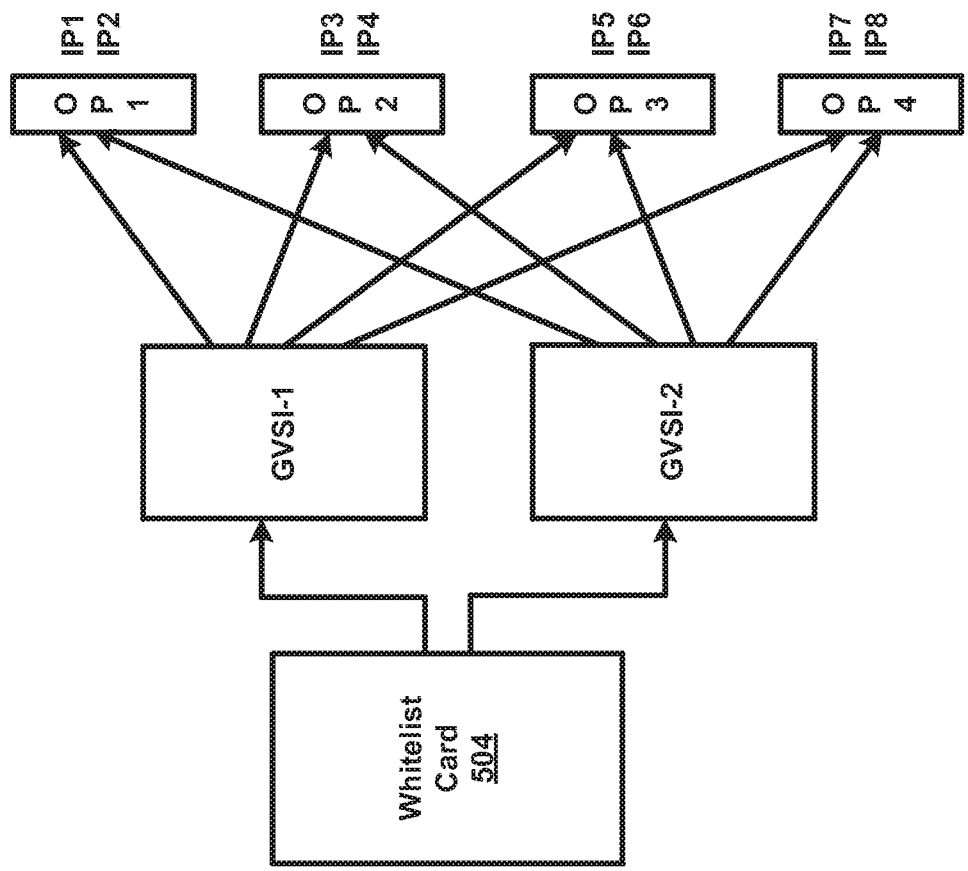

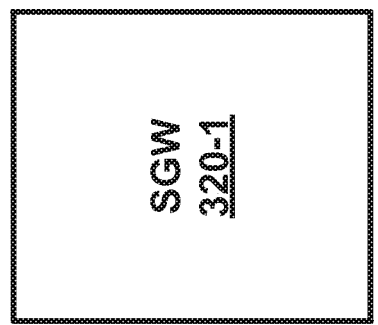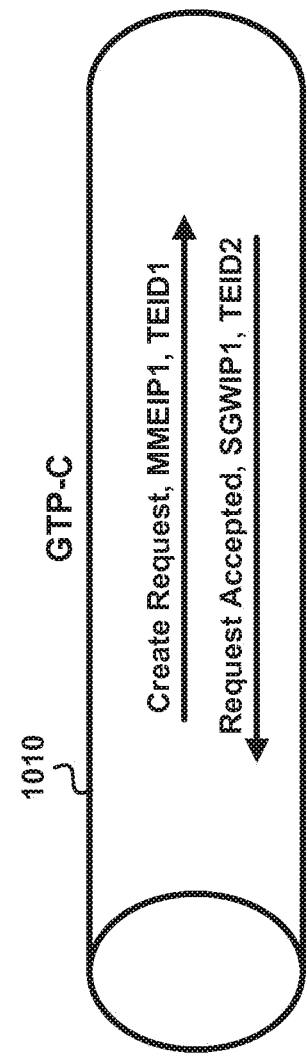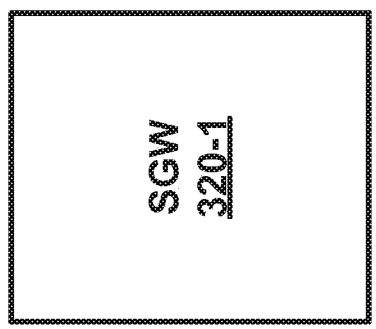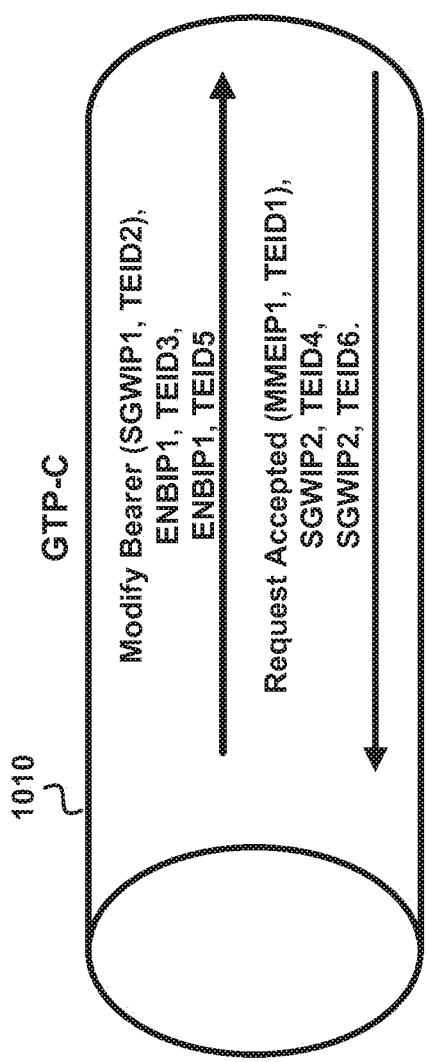
FIG. 10A
FIG. 10B

ARCHITECTURE FOR A NETWORK VISIBILITY SYSTEM

RELATED APPLICATIONS

The present application is related to and claims priority from the following Patent Applications, each naming as Applicant: Brocade Communications Systems, Inc., which are all incorporated into the instant patent application in their entirety to the extent not inconsistent with the disclosure of the instant patent application:

a. India Provisional Application Number: 3037/CHE/2015; Entitled, "Configuration of A Network Visibility System"; Inventors: Pragash et al; Filed on: 17 Jun. 2015;

b. India Provisional Application Number: 3893/CHE/2015; Entitled, "Architecture for a Network Visibility System"; Inventors: Sharma et al; Filed on: 29 Jul. 2015;

c. India Provisional Application Number: 3308/CHE/2015; Entitled, "Configuration of Rules in a Network Visibility System"; Inventors: Sharma et al; Filed on: 29 Jun. 2015; and d. India Provisional Application Number: 3310/CHE/2015; Entitled, "Configuration Of Load-Sharing Components of a Network Visibility Router in a Network Visibility System"; Inventors: Sharma et al; Filed on: 29 Jun. 2015.

In addition, the present application is a continuation-in-part of the following US patent applications, which are incorporated into instant patent application in their entirety to the extent not inconsistent with the disclosure of the instant patent application:

a. U.S. Non-provisional application Ser. No. 14/848,586, filed Sep. 9, 2015, entitled "Techniques for Exchanging Control and Configuration Information in a Network Visibility System", which claims priority to U.S. Provisional Application No. 62/137,073, filed Mar. 23, 2015, entitled "Techniques for Exchanging Control and Configuration Information in a Network Visibility System"; and b. U.S. Non-provisional application Ser. No. 14/848,645, filed Sep. 9, 2015, entitled "Techniques for Efficiently Programming Forwarding Rules in a Network Visibility System", which claims priority to U.S. Provisional Application No. 62/137,084, filed Mar. 23, 2015, entitled "Techniques for Efficiently Programming Forwarding Rules in a Network Visibility System".

The present application is also related to the following US patent applications, naming as Applicant: Brocade Communications Systems, Inc., which are all incorporated into the instant patent application in their entirety to the extent not inconsistent with the disclosure of the instant patent application:

a. patent application Ser. No. 14/927,482; Filed: Oct. 30, 2015; Entitled, "Configuration of Rules in a Network Visibility System"; Inventors: Sharma et al;

b. patent application Ser. No. 14/927,478; Filed: Oct. 30, 2015; Entitled, "Configuration of A Network Visibility System"; Inventors: Pragash et al;

c. patent application Ser. No. 14/927,484; Filed: Oct. 30, 2015; Entitled, "Configuration of Load-Sharing Components of a Network Visibility Router in a Network Visibility System"; Inventors: Sharma et al;

d. patent application Ser. No. 14/603,304; filed: Jan. 22, 2015; Entitled, "Session-Based Packet Routing For Facilitating Analytics"; and e. patent application Ser. No. 14/848,677, filed Sep. 9, 2015, entitled "Techniques for User-Defined Tagging of Traffic in a Network Visibility System".

BACKGROUND

Technical Field

The present disclosure relates to mobile data analytics systems and more specifically to an architecture for a network visibility system.

Related Art

Network visibility systems are designed for facilitating analysis of data traffic flows by analytic servers for aspects such as performance and usage patterns. The architecture of a network visibility system must support the processing of many packets of mobile data traffic, with sufficient safeguards to ensure fail-safe processing of such traffic. Also, due to the ever increasing volumes of mobile data traffic, the architecture of the network visibility system must also support easy scalability, to accommodate the enhanced processing requirements.

Aspects of the present disclosure relate to architecture for a network visibility system which supports one or more of such requirements.

BRIEF DESCRIPTION OF THE DRAWINGS

Example embodiments of the present disclosure will be described with reference to the accompanying drawings briefly described below.

FIG. 6A depicts a zoning table showing example entries for forwarding GTP packets in a packet router in an embodiment of the present disclosure.

FIG. 6B depicts a native-IP table showing example entries for forwarding non-GTP packets in a packet router in an embodiment of the present disclosure.

FIG. 6C depicts a whitelist table showing example entries for filtering GTP packets in a packet router in an embodiment of the present disclosure.

FIG. 6D depicts a default rules table showing example entries for filtering GTP packets in a packet router in an embodiment of the present disclosure.

FIG. 6E depicts a dynamic rules table showing example entries for filtering GTP packets in a packet router in an embodiment of the present disclosure.

FIG. 9 is a table showing example IP addresses discovered during operation of a network visibility system, in an embodiment of the present disclosure.

FIG. 10A is a diagram depicting a control session being formed between two network elements in an embodiment.

FIG. 10B is a diagram depicting data sessions being formed between two network elements in an embodiment.

FIG. 11 is a block diagram of an example default configuration of some components of a packet router in an embodiment of the present disclosure.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
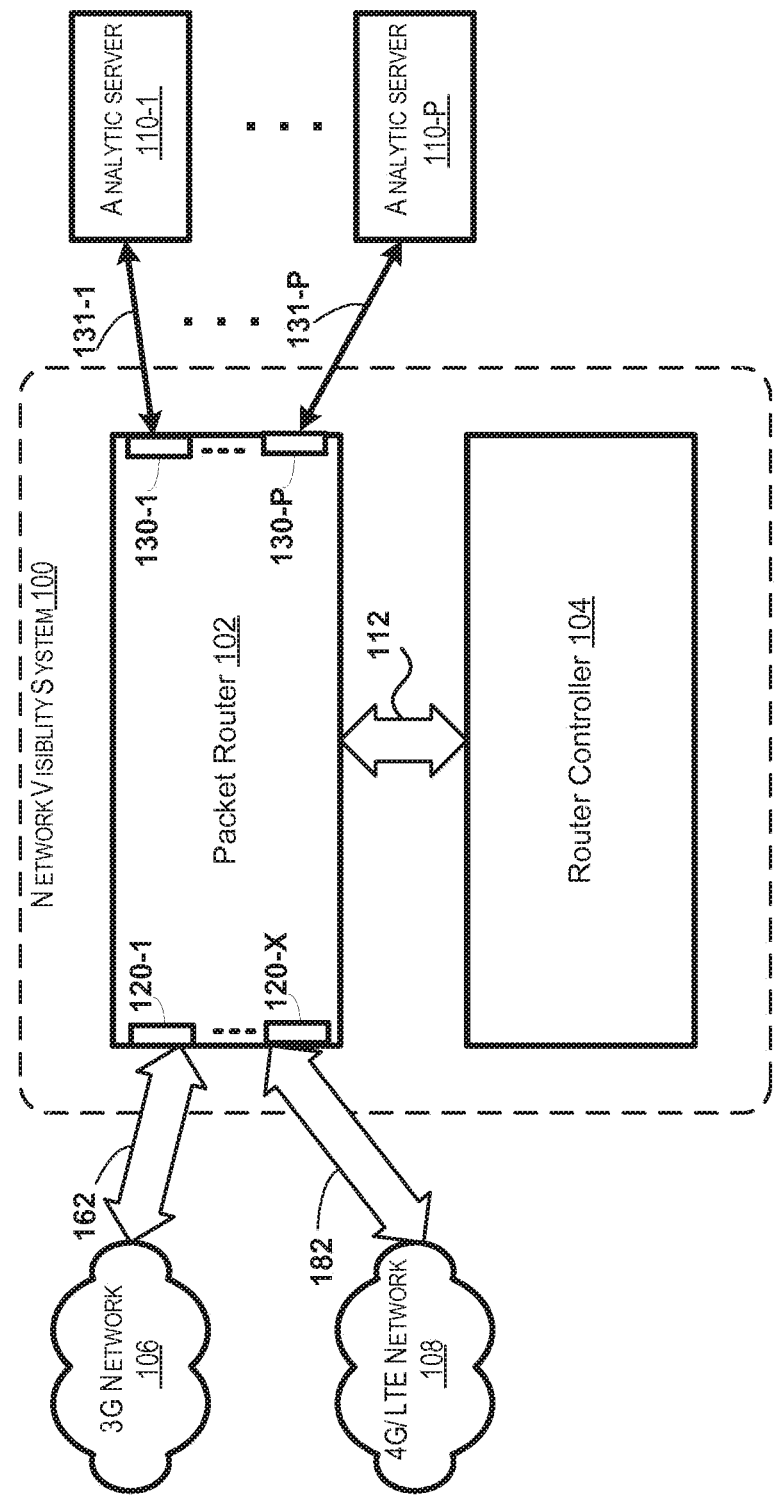
FIG. 1 is a block diagram illustrating an example environment in which several aspects of the present disclosure can be implemented.

Aspects of the present disclosure provide a suitable architecture for a router controller which configures forwarding rules in a packet router of a network visibility system. In an embodiment, the router controller contains multiple controller blocks, with each controller block to examine a corresponding set of packets and to generate a respective set of forwarding rules for configuring the packet router.

The router controller may also contain a switch to receive multiple packets and to forward to each controller block the corresponding set of packets. Each controller block may forward the respective set of forwarding rules to the switch, with the switch in turn configuring the packet router with the respective set of forwarding rules.

According to another aspect, each (active) controller block is provided a backup block, which is in a passive mode when the controller block is operational. Upon an active controller block becoming non-operational, the backup block switches role to become the active block. Both blocks of the pair receive packets from the switch on the same path, and accordingly the switch can continue to distribute packets on the same paths, even if some of the active blocks become non-operational.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

General Packet Radio Service (GPRS) is a standard for wireless communications that enables data to be transmitted at speeds up to 115 kilobits per second, compared with Global System for Mobile Communications (GSM) systems' 9.6 kilobits per second. GPRS supports a wide range of bandwidths and thus is suitable for sending and receiving small bursts of data (e.g., e-mail, Web browsing data) as well as larger volumes of data (e.g., video streams, file downloads).

GPRS Tunneling Protocol (GTP) is a group of Internet Protocol (IP)-based communications protocols used to carry packets conforming to the GPRS standard within GSM, UMTS and LTE networks. GTP can be decomposed into a number of separate protocols, including GTP-C and GTP-U. In 3G and 4G/LTE wireless networks, GTP-C messages are control messages that are used between network elements to activate and de-activate sessions originating from mobile user endpoints. As an example, in 3G networks, GTP-C is used within a GPRS core network for signaling between gateway GPRS support nodes (GGSN) and serving GPRS support nodes (SGSN).

This allows the SGSN to activate a session on a user's behalf, deactivate the same session, adjust quality of service parameters, or update a session for a subscriber who has just arrived from another SGSN. GTP-U is used for carrying user data within a GPRS core network and between a radio access network and the core network. The user data transported can be packets in any of IPv4, IPv6, or Point-to-Point Protocol (PPP) formats.

For various reasons, an operator of a wireless telecommunication network, such as a 3G or 4G/LTE network, may be interested in analyzing traffic flows within the network. For instance, the operator may want to collect and analyze flow information for network management or business intelligence/reporting. Alternatively or in addition, the operator may want to monitor traffic flows in order to, e.g., detect and thwart malicious network attacks.

To facilitate these and other types of analyses, the operator can implement a network telemetry, or "visibility," system, such as system 100 shown in FIG. 1. At a high level, network visibility system 100 can intercept traffic flowing through one or more connected networks (in this case, a 3G network 106 and a 4G/LTE network 108, as examples) and can intelligently distribute the intercepted traffic to a number of analytic servers 110(1)-(P). Analytic servers 110(1)-(P) (which may be operated by the same operator/service provider operating networks 106 and 108) can then analyze the received traffic for various purposes (e.g., network management, reporting, security).

In the example of FIG. 1, network visibility system 100 comprises two components: a packet router 102 and a router controller 104. Packet router 102 (which may be implemented using, e.g., a network switch or other similar network device) can be considered part of the data plane of network visibility system 100 and is generally responsible for receiving mobile traffic (e.g., GTC-P and GTP-U packets) intercepted from taps in 3G network 106 (via paths 162) and 4G/LTE network 108 (via paths 182), and forwarding the traffic, at line rate or near line rate, to analytic servers 110-through 110-P. Each path of paths 162 originates at one of the tap points on 3G network 106 and connects to one of input ports 120-1 through 120-X of packet router 102. Each path of paths 182 originates at one of the tap points on 4G/LTE network 108 and connects to one of input ports 120-1 through 120-X of packet router 102. Output ports 130-1 through 130-P on packet router 102 are respectively connected to analytic servers 110-1 through 110-P via respective paths 131-1 through 131-P.

Router controller 104 (which may be implemented using, e.g., a blade(s)/server computer system, such as an x86 server) can be considered part of the control plane of network visibility system 100 and is generally responsible for determining, based on a mirrored stream of GTP-C traffic sent from packet router 102 via path 112, forwarding rules on behalf of packet router 102. Once these forwarding rules have been formed, router controller 104 can program the rules into packet router 102's tables (via path 112) so that packet router 102 can forward network traffic to analytic servers 110-1 to 110-P according to customer (e.g., network operator) requirements.

While packet router 102 and router controller 104 are shown as separate systems (implying implementation based on corresponding separate hardware components), it should be appreciated that alternative embodiments can be implemented in other configurations, as will be apparent to one skilled in the relevant arts by reading the disclosure provided herein. For example, packet router 102 and router controller 104 may be implemented (with suitable modifications) as respective virtual machines realized on one or more physical machines. In such embodiments, the physical ports (both input and output) of FIG. 1 may be realized (or implemented), for example, as ports on top of various transport protocols (e.g., UDP and TCP in IP environment).

It may be generally appreciated that the packets constituting the network traffic need to be tapped from desired tap points from the networks of interest such that the necessary data packets and control packets are provided to network visibility system 100. The network tap points in respective example implementations of 3G and 4G networks are briefly noted below. It should be appreciated that at least some of the features of the present disclosure can be implemented in the context of future generation mobile networks as well.

3. Network Taps

Figure 2:
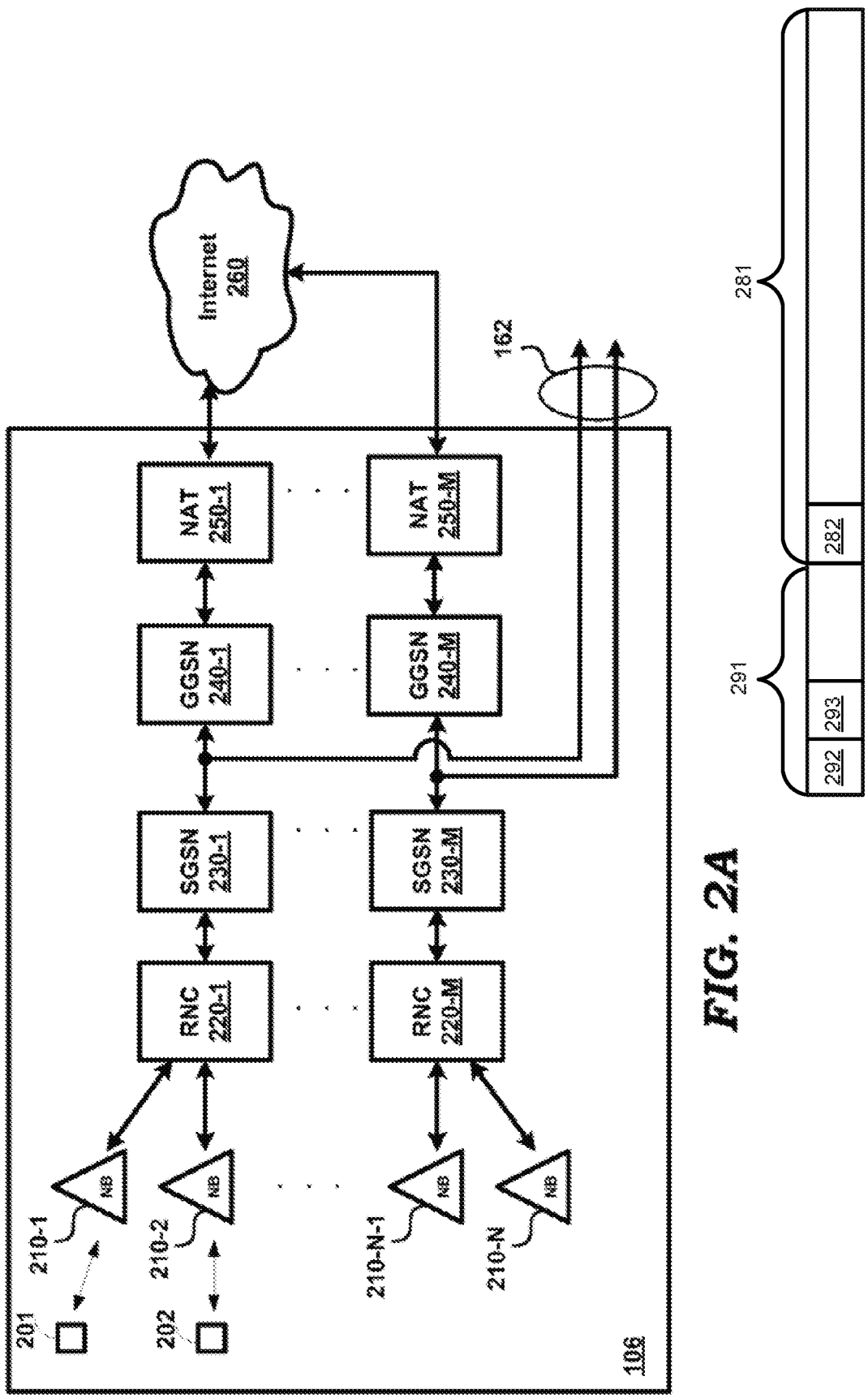
FIG. 2A is a block diagram showing representative components of a 3G network, as related to GPRS, in one embodiment.
FIG. 2B is a diagram illustrating the packet format of a GTP packet.
Figure 3:
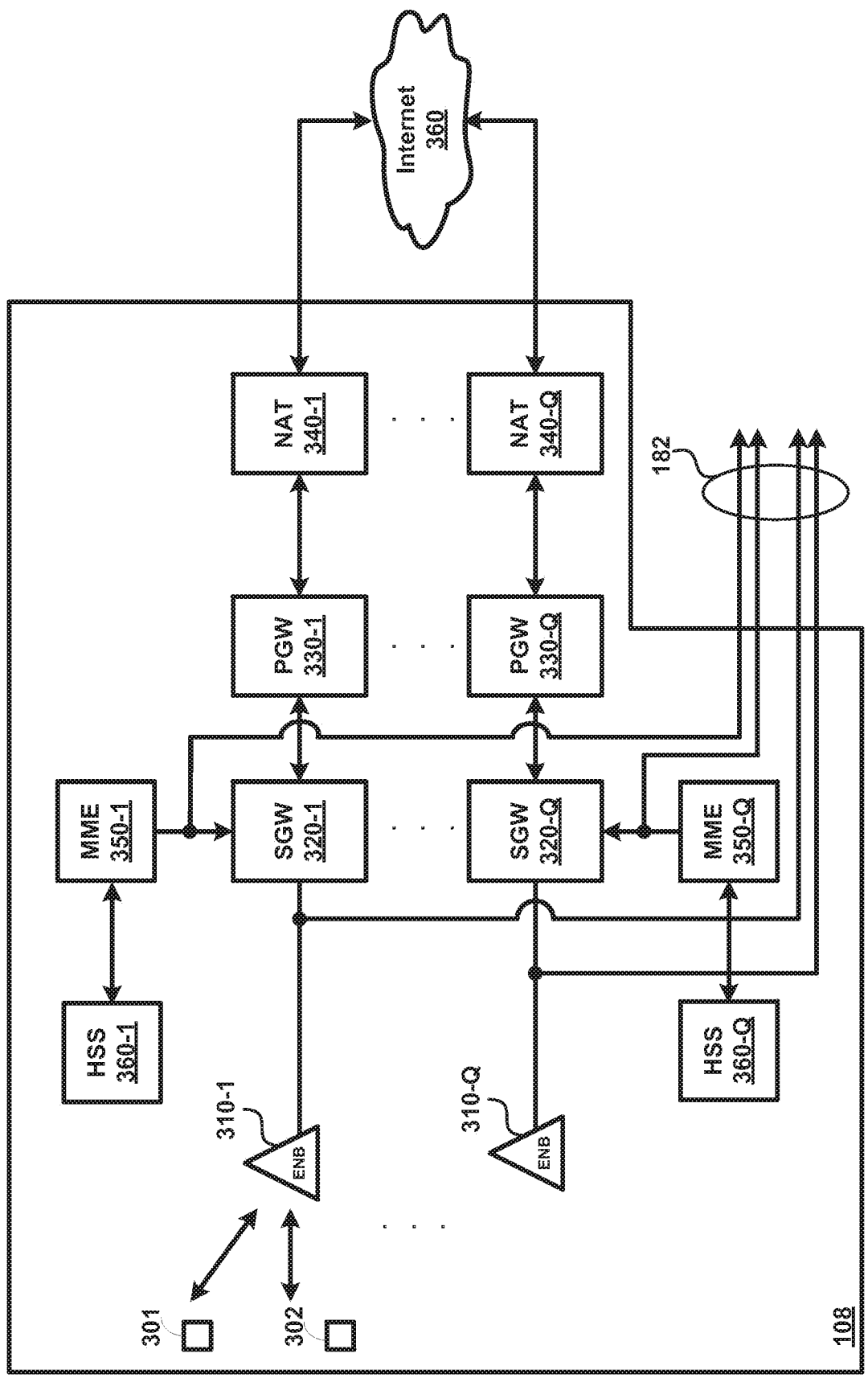
FIG. 3 is a block diagram showing representative components of a 4G/LTE network, as related to GPRS, in one embodiment.

The general operation of the components of FIG. 2 and FIG. 3 is described in corresponding ones of documents 3GPP TS 25.401, 3GPP TS 23.401, 3GPP TS 23.402, 3GPP TS 09.60, 3GPP TS 29.60, 3GPP TS 24.301, 3GPP TS 36.413, 3GPP TS 29.118, 3GPP TS 29.272, 3GPP TS 29.274, 3GPP TS 29.281, 3GPP TS 36.410, 3GPP TS 25.413 and 3GPP TS 29.002, available from 3GPP Organizational Partners' Publications Offices.

FIG. 2A is a block diagram showing the representative components of 3G network 106, as related to GPRS, in one embodiment. 3G network 106 is shown containing user equipment (UE) 201-202, NodeB (NB) 210-1 through 210-N, radio network controller (RNC) 220-1 through 220-M, Serving GPRS Support Nodes (SGSN) 230-1 through 230-M, Gateway GPRS Support Node (GGSN) 240-1 through 240-M, and network address translation block (NAT) 250-1 through 250-M.

Broadly, user equipment 201-202 (e.g., mobile phones, tablet computers) access Internet via NBs (e.g., cell towers or base stations) 210-1 and 210-2, which provides wireless communication facility to the user equipment. RNC 220-1 provides various radio resource management functions, in addition to providing for encryption of data sent to the user equipment and decryption of data received from user equipment.

SGSN 230-1 processes the packet switched data received on GPRS, and provides the mobility management functions (in addition to authentication of users). GGSN 240-1 provides interworking between the GPRS network and external packet switched networks, such as Internet 260. NAT 250-1 provides network address translation (NAT) functions for packets being transmitted and received, in a known way.

It may be appreciated that each user equipment (such as 201/202) can have multiple sessions for sending and receiving data (e.g., one for video, another for Internet access data, yet another for telephony functions). The data corresponding to each session may be carried in the form of a corresponding tunnel in each of the two hops RNC-SGSN, SGSN-GGSN. The corresponding packet format is depicted in FIG. 2B, in which native packet 281 (shown including native TCP/IP header 282) is shown encapsulated by tunnel header 291 (shown including UDP header 292 and tunnel end point identifier (TEID) 293).

The IP packet in the wireless path between UE and NB, between the NB and the RNC, and between GGSN and NAT is transmitted in its native form (instead of being encapsulated by tunnel headers). In other words, the packets transmitted on these paths would contain only native packet 281 (but not tunnel header 291). Such native IP packets are referred to as non-GTP packets in the description herein.

Tunnel endpoint identifiers (TEIDs) are allocated on activation of a GTP tunnel. Each network element involved in a tunnel (sender/receiver) signals to the opposing node in the flow from which it wishes to receive subsequent messages, its TEID and its IP address. When the respective combination of TEID and IP address is passed by each end element of a tunnel with the element of the other end, the tunnel is said to be formed. Each tunnel endpoint is thus uniquely represented by the combination of the TEID and the associated IP address.

Initially, when user equipment 201 requests a session to be created, a control session and a data session (to exchange data) are established between the SGSN 230-1 and GGSN 240-1, initiated by the SGSN 230-1. Data received thereafter at GGSN 240-1 destined to the user equipment 201, is transferred on the data session thus formed between SGSN 230-1 and GGSN 240-1. The sessions' tunnels will have a corresponding TEID and IP address (i.e., tunnel endpoints) associated with each of the two elements of the tunnel. More than one data session can be formed to exchange data between SGSN 230-1 and GGSN 240-1.

Packets are shown being tapped on paths between respective pairs of network elements, with each pair containing an SGSN and a GGSN, coupled by a path. The tapped data is provided via path 162 to packet router 102. As may be appreciated, the tunnel outer header 291 would contain the IP addresses of the GGSN and SGSN. While only one path is described for conciseness, the components in the remaining paths would operate similarly.

It should be appreciated that network visibility system 100 may analyze packets related to many hundreds or thousands of such GGSN-SGSN pairs. Further, although not shown in FIG. 3, other paths in the 3G network of FIG. 2 may also be tapped to obtain packets flowing between corresponding node pairs (e.g., NB 210-1 and RNC 220-1). The description is continued with respect to the components of 4G/LTE network 108.

FIG. 3 is a block diagram showing the representative components of 4G/LTE network 108 in one embodiment. 4G/LTE network 108 is shown containing user equipment 301-302, ENodeBs (ENB) 310-1 through 310-Q, serving gateway (SGW) 320-1 through 320-Q, packet-data-network gateway (PGW) 330-1 through 330-Q, network address translation block (NAT) 340-1 through 340-Q, mobility management entity (MME) 350-1 through 350-Q, and home subscriber servers (HSS) 360-1 through 360-Q.

Broadly, user equipment 301-302 (e.g., mobile phones, tablet computers) access Internet via ENB (e.g., cell tower or base station) 310-1, which provides wireless communication facility to the user equipment. The pair of SGW 320-1 and PGW 330-1 operates in the data plane, implying the user data is transported by the pair in both directions. PGW 330-1 provides interworking between the 4G network and external packet switched networks, such as Internet 360. In particular, PGW 330-1 allocates IP addresses to the user equipment during setup of the connection, and also provides filtering of the user data. NAT 340-1 provides network address translation (NAT) functions for packets being transmitted and received, in a known way.

MME 350-1 operates in the control plane providing control/signaling functions related to, for example, mobility and security. HSS 360-1 is a database storing user-related information, which is used for supporting functions in mobility management, call and session setup, user authentication and access authorization.

Similar to the 3G network, TEIDs in 4G/LTE networks are allocated on activation of a GTP tunnel. Each network element involved in a tunnel (sender or receiver) signals to the opposing node in the flow with which it wishes to receive subsequent messages, its TEID and its IP address. When the pair of TEIDs and IP addresses between the two network elements is exchanged, a tunnel is said to be formed. It may be appreciated that the packet format is similar to that shown in FIG. 2B, for packets exchanged via the tunnels.

Initially, when user equipment 301 requests a session to be created, a control session is established between the MME 350-1 and SGW 320-1, initiated by MME 350-1. Thereafter, a data session (or more than one data sessions) is formed between ENB 310-1 and SGW 320-1 to exchange data. Similarly, when data is received at SGW 320-1 destined to the user equipment 301, a data session (or more than one data sessions) is established between SGW 320-1 and ENB 310-1, initiated by SGW 320-1 via MME 350-1. The sessions' tunnels will have a corresponding TEID and IP address (i.e., tunnel endpoints) associated with each of the two network element pairs of the tunnel. While only one path is described for conciseness, the components in the remaining paths would operate similarly.

Various packets are shown being tapped on paths between respective pair of ENB and SGW, as well as between respective pairs of MME and SGW, and provided via path 182 to packet router 102. Again, although not shown in FIG. 3, other paths in the 4G/LTE network of FIG. 4 may also be tapped to obtain packets flowing between corresponding node pairs (e.g., SGW 320-1 to PGW 330-1, HSS 360-1 to MME 350-1).

Thus, the packets captured at the various network tap points depicted in FIGS. 2 and 3 are sent to network visibility system 100 (in particular, ingress ports 120-1 to 120-X of packet router 102). Network visibility system 100 in turn forwards the received packets to the appropriate analytic servers 110-1 to 110-P based on various forwarding rules. However, forming and applying the forwarding rules may present various challenges, which are addressed by several aspects of the present disclosure, as described below with examples.

4. Simplifying Formation of Forwarding Rules

In an embodiment of the present disclosure, formation of the forwarding rules may require various IP addresses operative in relation to networks 106 and 108. In one prior approach, administrators may be required to provide such IP addresses manually, which may lead to undesirable situations such as errors and undesirable overheads. An aspect of the present disclosure simplifies identification of the IP addresses in network visibility systems.

Figure 4C:
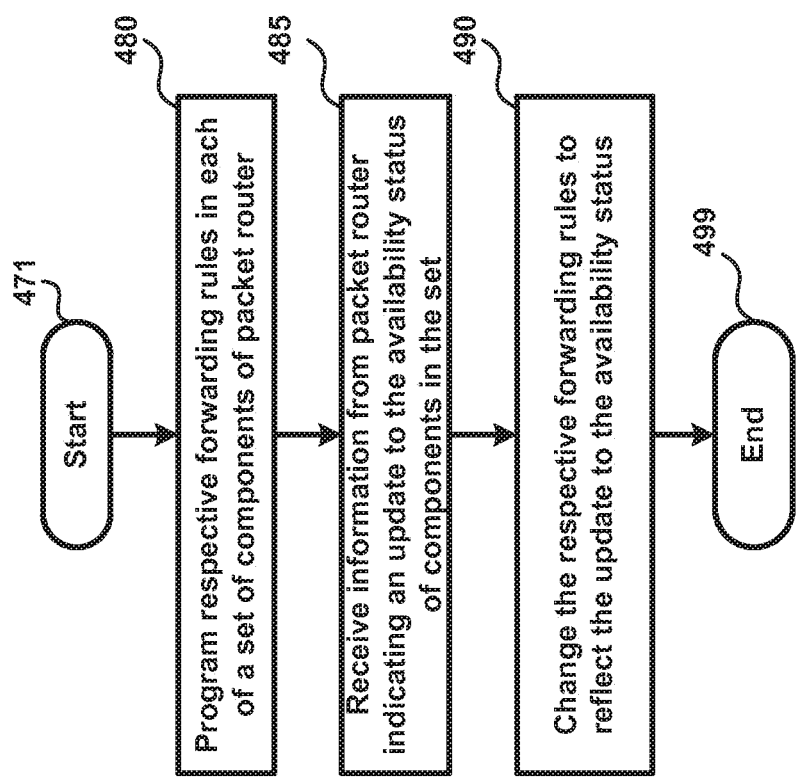
FIG. 4C is a flow chart illustrating the manner in which change of availability status of components in a packet router, is addressed in an embodiment of the present disclosure.
Figure 4A:
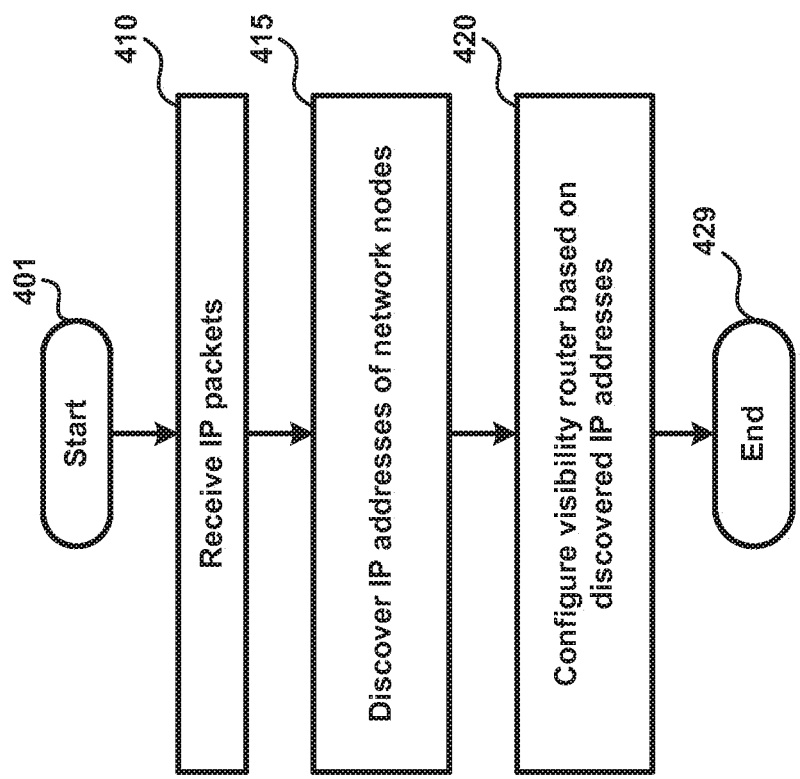
FIG. 4A is a flow chart illustrating the manner in which formation of forwarding rules is simplified in a network visibility system in an embodiment of the present disclosure.

FIG. 4A is a flow chart illustrating the manner in which formation of forwarding rules is simplified in a network visibility system in an embodiment of the present disclosure. The flowchart is described with respect to FIG. 1, in particular, router controller 104, merely for illustration. However, many of the features can be implemented in other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 401, in which control immediately passes to step 410.

In step 410, router controller 104 receives IP packets tapped from networks 106/108. In an embodiment described herein, the packets include GTP packets and native (i.e., without being tunneled) IP packets, though other packets can be tapped and received as suited according to corresponding analysis approach. Control then passes to step 415.

In step 415, router controller 104 discovers (learns) IP addresses of various network nodes in networks 106/108 by examining the fields of interest in the corresponding communication packets. A network node refers to any processing device that operates at the network/IP level, implying that the device has an assigned IP address using which packets are received and sent in accordance with the IP protocol. As is well known in the relevant arts, an IP address uniquely identifies the corresponding machine to which the address is assigned. In IPV4, each IP address contains 32-bits. Control then passes to step 420.

In step 420, router controller 104 configures packet router 102 using the discovered IP addresses. As a result, packet router 102 forwards the subsequently received IP packets to respective analytic servers 110-1 to 110-P, as configured by router controller 104. Control then passes to step 429, in which the flow chart ends.

Due to such reliance on discovery based on received packets, the desired IP addresses may all be accurately identified, thereby at least avoiding the overheads and error possibilities, noted above with the manual approach, in addition to ensuring reliable analysis of the related packets in analytic servers 110-1 to 110-P. Reliable formation of forwarding rules by router controller 104 is thus simplified.

The manner in which the features noted above with respect to FIG. 4A can be implemented with respect to example embodiments is described in sections below. The description is continued with respect to another aspect of the present disclosure.

5. Ensuring Analysis of all Packets of a Single User by a Same Analytic Server

In an embodiment of the present disclosure, each analytics server is designed to analyze all packets (control and data) related to a single user equipment (UE), i.e., related to a single IMSI (International Mobile Subscriber Identity). However, as many forwarding rules are based on addresses of network nodes and as each network node (or link between nodes) is shared for transferring packets related to multiple UEs, forwarding rules based merely on IP addresses of network nodes may present conflicts with the requirement of analyzing all packets related to a single UE by a single analytics server.

Accordingly, it would be desirable to have techniques that enable router controller 104 to configure dynamic filters that group packets originating from the same user (also known as a "subscriber"), across various data and control sessions, even though the packets may have different associated IP addresses (i.e., tunnel endpoint IP addresses). Several aspects of the present disclosure enable a router controller to specify rules for grouping the data traffic forwarded to analytic servers 110 in a user-centric manner, as described below in further detail.

Figure 4B:
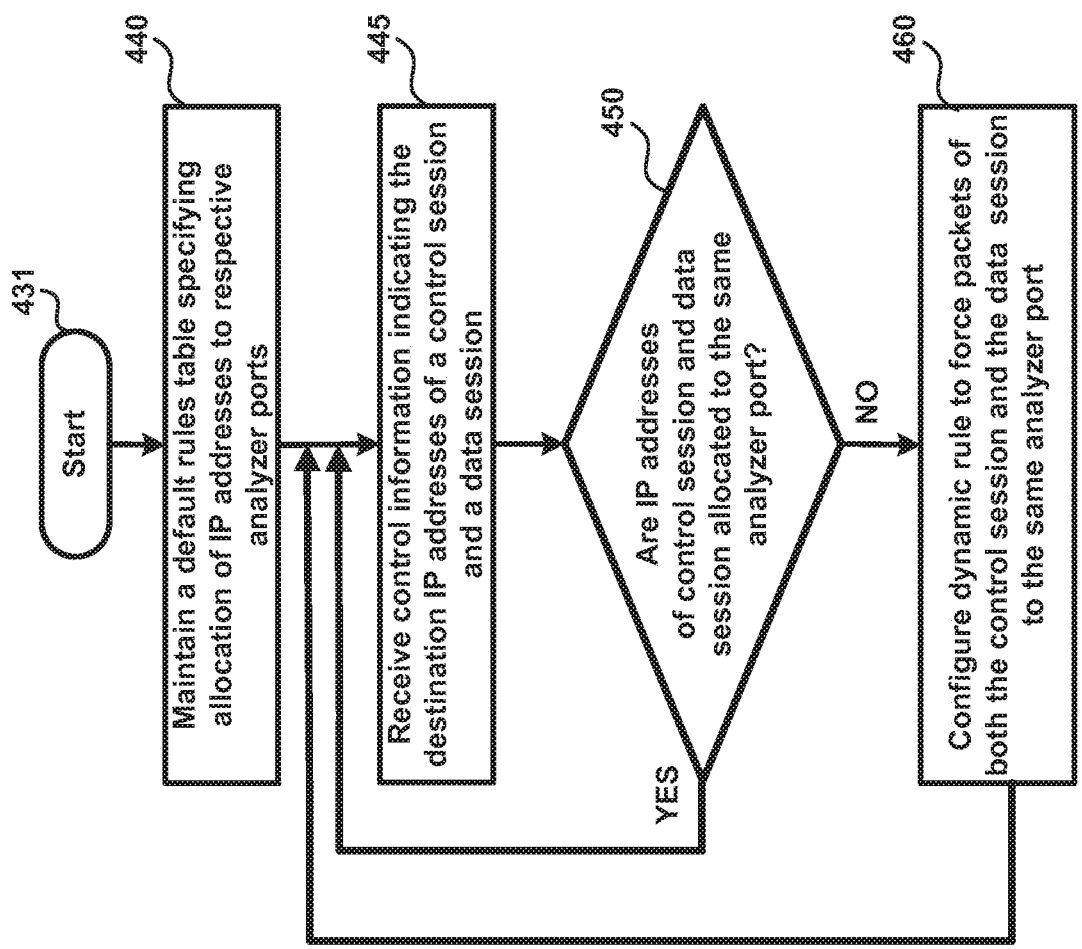
FIG. 4B is a flow chart illustrating the manner in which dynamic filters in a network visibility system are configured in an embodiment of the present disclosure.

FIG. 4B is a flow chart illustrating the manner in which dynamic filters in a network visibility system are configured in an embodiment of the present disclosure. The flowchart is described with respect to FIG. 1, in particular, router controller 104, merely for illustration. However, many of the features can be implemented in other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 431, in which control immediately passes to step 440.

In step 440, router controller 104 maintains a default rules table specifying allocation of IP addresses to respective output ports. The IP addresses are of the tunnel endpoints of various sessions maintained related to providing connectivity for user equipment. In case of 4G/LTE network 108, the IP addresses are of various SGWs and eNBs shown in FIG. 3.

In step 445, router controller 104 receives control information indicating the respective tunnel endpoint IP addresses for a control session and a data session. In an embodiment, the control information may be received as part of one or more control packets received from the 3G or 4G networks. Specifically, in case of 4G/LTE network, the control packets are received from the tap point on the link between respective pair of MME and SGW. In case of 3G network, the control packets are received from the tap point on the link between respective pairs of SGSN and GGSN.

In step 450, router controller 104 determines whether the IP addresses of the control session and the data session are allocated to the same output port. If yes, control moves to step 445. If, per step 450, the (endpoint) IP addresses of the control session and the data session are not allocated to the same output port, control moves to step 460.

In step 460, router controller 104 configures a dynamic rule to force packets of both the control session and the data session to the same output port. The dynamic rules may be implemented in one of several known ways, to bypass the operation of default rules based on IP addresses of tunnel endpoints. Control thereafter returns to step 445.

It may thus be appreciated that the user can specify a single output port at which to send all data pertaining to an end user's control and data sessions. In embodiments described below, the IP addresses corresponding control sessions are allocated to specific output port (and thus to the corresponding analytic server). However, alternative embodiments can be implemented using other approaches, as will be apparent to one skilled in the relevant arts by reading the disclosure provided herein.

While example embodiments implementing the features of FIG. 4B are described in sections below, the description is continued with respect to another aspect of the present disclosure.

6. Addressing Change of Availability Status of Components in a Packet Router

It may be appreciated that packet router 102 may contain several components and the applying of the forwarding rules against the incoming packets may be distributed among such components. It may be appreciated that at least some of the components may fail, thereby becoming unavailable. Alternatively, new components may be added or a previously unavailable component may become available. The manner in which such changes in availability status of components in a packet router is addressed according to an aspect of the present disclosure, is described below with examples.

FIG. 4C is a flow chart illustrating the manner in which change of availability status of components in a packet router, is addressed in an embodiment of the present disclosure. The flowchart is described with respect to FIG. 1, in particular, router controller 104 and packet router 102, merely for illustration. However, many of the features can be implemented in other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 471, in which control immediately passes to step 480.

In step 480, router controller 104 programs respective forwarding rules in each of a set of load-sharing components of packet router 102. Each component in the set is designed to provide the same or a substantially similar function, and operates to forward communication packets according to the respective programmed forwarding rule. Control then passes to step 485.

In step 485, router controller 104 receives information from packet router 102 indicating an update to the availability status of components in the set of components. Examples of such status include failure of a component in the set, augmentation of the set by addition of a new component to the set. Control then passes to step 490.

In step 490, router controller 104 changes the respective forwarding rules to reflect the update to the availability status. For example, assuming the update indicated failure of a component in the set, router controller 104 re-assigns the forwarding rules assigned earlier to the failed component to the remaining (functioning) components in the set. The re-assignment of the forwarding rules may be done in a load-balanced manner. Control then passes to step 499, in which the flow chart ends.

Thus, the change of availability status of components in packet router 102 is addressed by router controller 104 in network visibility system 100. By addressing the changes in the availability status, packet router 102 is facilitated to forward the packets to the analytic servers at line rate or near line rate. The manner in which the features noted above with respect to FIG. 4C can be implemented with respect to example embodiments is described in sections below.

It may be appreciated that the nature of the forwarding rules depends on the internal architecture of packet router 102. Accordingly, the description is continued with respect to the details of packet router 102 in an embodiment.

7. Details of Packet Router

Figure 5:
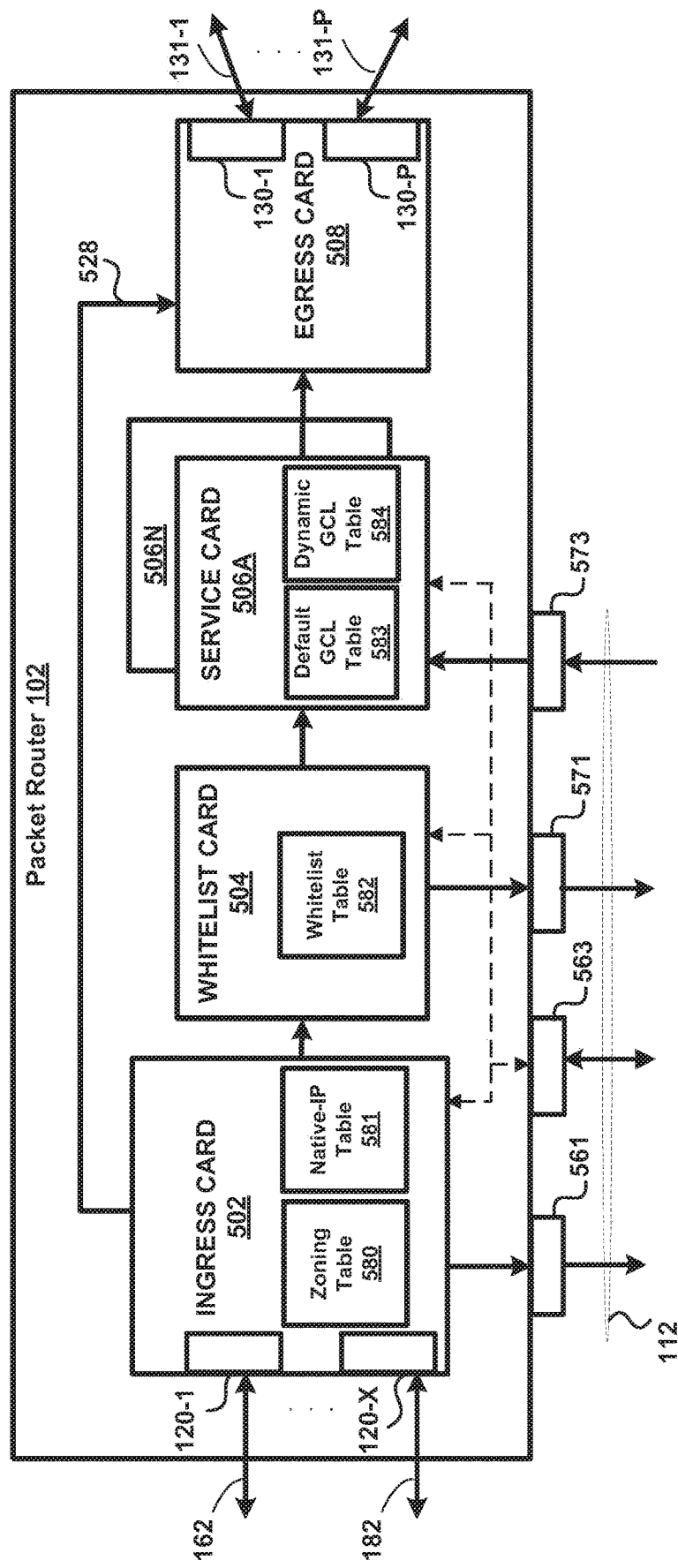
FIG. 5 is a block diagram illustrating the architecture of packet router in an embodiment of the present disclosure.

FIG. 5 depicts a more detailed representation of the architecture of packet router 102 in an embodiment of the present disclosure. As shown in FIG. 5, packet router 102 internally includes an ingress card 502, whitelist card 504, service cards 506A-506N, and egress card 508. Control port 563, service port 573, learning port 561 and mirror port 571 collectively represent path 112 in FIG. 1. Further, although only a single instance of ingress card 502, whitelist card 504, and egress card 508 are shown in FIG. 5, it should be appreciated that any number of these cards may be supported in alternative embodiments.

Ingress card 502 is shown containing input ports 120-1 through 120-X, which are communicatively coupled with one or more networks to be monitored (e.g., 3G network 106 via path 162 and 4G/LTE network 108 via path 182). Ingress card 502 receives packets on input ports 120-1 through 120-X (from paths 162/182), and forwards each packet on path 528 or to whitelist card 504. Ingress card 502 determines whether the packet is a GTP packet (i.e., a GTP-C or GTP-U packet) or not. If the packet is not a GTP packet, ingress card 502 can match the packet against a native-IP table 581 that contains forwarding entries for non-GTP traffic. Based on the native-IP table 581, ingress card 502 can forward the packet, on path 528, to an appropriate output port 130-1 through 130-P (on egress card 508) for transmission to one of the analytic servers 110-1 to 110-P (e.g., an analytic server that has been specifically designated to process non-GTP traffic).

In an embodiment, ingress card 502 may be configured such that non-GTP traffic which does not match any of the rules in native-IP table 581, and GTP traffic that does not match any of the rules in zoning table 580, are dropped (i.e., not forwarded or processed further), in which case port 561 is non-existent in corresponding embodiments. Alternatively, accordingly to an aspect of the present disclosure, such non-matching packets (GTP packets as well as native-IP/non-GTP packets which have no matching entries in zoning table 580 and native-IP table 581 respectively) are forwarded on learning port 561 such that router controller 104 can learn IP addresses for generating additional rules, as described above with respect to FIG. 4A and in further detail in sections below.

On the other hand, if the packet is a GTP packet, ingress card 502 can match the packet against zoning table 580 and can tag the packet with a zone VLAN ID (as specified in the matched zoning entry) as its inner VLAN tag and a service instance ID as its outer VLAN tag. In one embodiment, the zone VLAN ID is dependent upon: (1) the input port on which the packet is received, and (2) the IP address range of the GGSN associated with the packet in the case of a 3G network, or the IP address range of the SGW associated with the packet in the case of a 4G/LTE network. Thus, the zone VLAN ID enables analytic servers 110-1 to 110-P to classify GTP packets based on such a [input ports, GGSN/SGW IP address range] combination.

In certain embodiments, the GTP traffic belonging to each zone may be mapped to two different zone VLAN IDs depending whether the traffic is upstream (i.e., to GGSN/SGW) or downstream (i.e., from GGSN/SGW). Once tagged (i.e., tag data representing the VLAN ID is appended or associated), the GTP packet can be forwarded to whitelist card 504. The VLAN ID may be used to distribute the processing load across multiple whitelist cards (though a single instance is shown in FIG. 5 for illustration) and/or service cards 506A-506N. In general, the forwarding rules in zoning table 580 are designed to distribute the load among the service cards. For example, each service card may be assigned to process a substantially equal number of IP addresses for an enhanced possibility that the processing load is evenly distributed among the service cards.

Whitelist card 504 receives the VLAN-tagged GTP packets from ingress card 502, and operates to filter the GTP packets according to rules specified by an operator, and stored in a whitelist table 582. Whitelisting enables significant reduction in the processing load of the analytics servers 110-1 to 110-P, by eliminating "non-interesting" (undesirable) network traffic. For example, packets originating from or destined to specific (non-interesting) IP addresses may be dropped by whitelist card 504 without further processing by components downstream in the processing pipeline of packet router 102.

In one embodiment, whitelist card 504 receives the packet forwarded from ingress card 502 and attempts to match the packet against the whitelist table 582, which includes match parameters (e.g., IP addresses of service providers) and pre-defined actions corresponding to the match parameters. Depending on the configuration of the whitelist table 582, the whitelist card 504 may be configured to either drop the GTP packets (thereby eliminating undesirable traffic) or to forward them to the service cards 506A-506N. Of the incoming GTP packets, GTP-C packets which are not dropped by whitelist card 504 are duplicated (i.e., "mirrored") and sent to router controller 104 on minor port 571.

Each of service cards 506A-506N can host one or more service instances, each of which is identifiable by a corresponding address, and which is responsible for processing some subset of the incoming GTP traffic from 3G network 106 and 4G/LTE network 108 (based on, e.g., GGSN/SGW). In a particular embodiment, a service card can host a separate service instance for each hardware packet processor implemented on the service card. The description is continued below with the example operation of a service instance of service card 506A, although other service cards also contain similar structure and functionality as of service card 506A.

In an embodiment, router controller 104 maintains a default GCL table and a dynamic GCL table in service card 506A. It should be appreciated that each service card has a corresponding pair of default and dynamic GCL tables, consistent with the definition and usage of VLAN IDs noted above. However, multiple service instances hosted on a same service card may share the same pair of tables.

Default GCL table 583 contains entries which operate to allocate GTP packets to respective output ports based on the tunnel endpoint the packet is destined to or originates from. Dynamic GCL table 584, provided according to an aspect of the present disclosure, contains dynamically-generated entries which override the operation of the default GCL table 583 to force packets of specific data sessions to desired output ports. In other words, if an entry of default GCL table 583 requires a packet to be forwarded to a first port, and an entry of dynamic GCL table 584 requires a packet to be forwarded to a second port, the packet is forwarded to the second port since the operation based on dynamic GCL table 584 overrides the operation based on default GCL table.

In operation, a service instance (in service card 506A) receives the GTP packet, and attempts to match the packet against the dynamic GCL table defined for the service instance/service card. If there is no match found in the dynamic GCL table 584, service card 506A may then examine entries stored in the default GCL table 583. If a match is found in dynamic GCL table 584, service card 506A forwards the GTP packet to an output port 130-1-

130-P (via egress card 508) based on the matched entry in the dynamic GCL table 584. On the other hand, if no match is found in dynamic GCL table 584, service card 506A forwards the GTP packet to an output port 130-1-130-P specified in a matching entry in the default GCL table 583.

Egress card 508 is shown containing output ports 130-1 through 130-P, which are communicatively coupled with corresponding analytic servers 110-1-110-P via paths 131-1-131-P respectively. Analytic servers 110-1 through 110-P are respectively connected to a corresponding one of output ports 130-1 through 130-P, which analyze all the packets related to a user, even if the user moves across areas covered by different NBs/ENBs.

Thus, packet router 102 receives mobile traffic (e.g., GTC-P and GTP-U packets) intercepted from taps in 3G network 106 (via paths 162) and 4G/LTE network 108 (via paths 182), and forwards the traffic to analytic servers 110-through 110-P. The description is continued with respect to the details of various tables stored in packet router 102 and programmed by router controller 104 in corresponding example scenarios.

8. Tables in a Packet Router

FIGS. 6A to 6E depict various tables in packet router 102 in an embodiment of the present disclosure. For illustration, only a sample set of columns and rows are shown for each table, though in actual implementation, each table may contain additional columns and rows, as will be apparent to one skilled in the relevant arts by reading the disclosure herein. In an embodiment, the values that are not stored/or is not of significance ("don't care") are indicated using asterisk (*). Each of the Figures/tables is described in detail below.

FIG. 6A depicts a zoning table, which is maintained to contain forwarding entries based on input ports and GGSN/SGW IP address range of incoming packets. As shown, zoning table 580 contains columns 650-655. Input port (column) 650 specifies the input port on which the packet is received. Source IP address 651 specifies the IP address of the GGSN/SGW, when GGSN/SGW is the source or sender of the packet, while destination IP address 652 specifies the IP address of the GGSN/SGW, when GGSN/SGW is the destination of the packet (e.g., en route to a server connected to Internet 360). The IP address of GGSN/SGW is identified either as a source or destination depending on whether the GGSN/SGW is positioned upstream or downstream in the context of the packet flow. For example, if the packet is coming from a server connected to Internet 360 to ENB 410, the IP address for SGW 420-1 would be a source IP address.

VLAN ID 653 specifies a zone VLAN ID that is tagged to the incoming packet. The values of VLAN IDs are generally specified by the customer or network operator (and provided to router controller 104 in a configuration file), and depends on the criteria of how zones are created in the network (3G and 4G). Service Instance ID 654 specifies the ID of the service instance (i.e., though shown as service card 506A-506N for illustration) to which the packet is programmed to be forwarded. Whitelist port 655 contains the port number on the whitelist card 504 to which the packet is programmed to be forwarded.

Row 610 indicates that for a packet received on port 120-1 with a destination IP address of SGWIP1, ingress card 502 is to tag the received packet with a VLAN ID of IV1, the service instance ID as service instance 506A, and the whitelist port as WP1. Similarly, row 611 indicates that for a packet received on port 120-2 with a source IP address of SGWIP2, ingress card 502 is to tag the received packet with VLAN ID of IV2, the service instance ID as service instance 506B, and the whitelist port as WP1.

FIG. 6B depicts a native-IP table, which is maintained to contain forwarding entries for non-GTP traffic. As shown, the native-IP table 581 contains columns 660-666. Destination IP address 660 specifies the IP address of the network element to which the non-GTP packet is directed. Source IP address 661 specifies the IP address of the network element from which the non-GTP packet originates. Protocol 662 identifies the identifier of the non-GTP protocol associated with the packet. Typically, this column identifies the IP protocol, as majority of the non-GTP packets are IP-protocol based packets in the 3G (106) and 4G/LTE (108) networks.

L4 source port 663 specifies the source port in the L4 header of the packet, while L4 destination port 664 specifies the destination port in the L4 header of the packet. Output port 665 specifies the port number on the egress card 508 to which the packet is programmed to be forwarded. VLAN ID 666 specifies a zone VLAN ID that is tagged to the incoming packet.

Row 615 indicates that for a packet received from a server with the source IP address of server1 and with a destination IP address of UE1, the packet is to be forwarded to the output port 130-1 with VLAN ID set to IV4. Similarly, row 616 indicates that for a packet received from a user equipment with the source IP address of server2 and with a destination IP address of UE2, the packet is to be forwarded to the output port 130-2 with VLAN ID set to IV5.

FIG. 6C depicts a whitelist table, which operates to filter the GTP packets according to rules specified by an operator. Whitelist table 582 contains user-specified whitelist entries and the corresponding predefined actions to be taken when data traffic matches the corresponding whitelist entries. As shown, the whitelist table 582 contains columns 670-672. Source IP address 670 specifies the IP address of the network element from which the packet originates, while destination IP address 671 specifies the IP address of the network element to which the packet is directed. Action 672 specifies the action (e.g., drop, forward to a specific port (port number being the action)) that is to be performed on the incoming packet.

Row 620 indicates that for a packet received from a server with the source IP address of server4 and with a destination IP address of UE5, the action is "drop" (that is, whitelist card 504 drops the packet). Similarly, row 621 indicates that for a packet received from a user equipment with the source IP address of UE7 and with a destination IP address of server5, the action is also "drop".

FIG. 6D depicts a default rules table, which is maintained to indicate allocation of network element's IP addresses to respective output ports in one embodiment. As shown, default GCL table 583 contains columns 680-682. Source IP address 680 specifies the IP address of the source network element from which packet is sent, while destination IP address 681 specifies the IP address of the destination network element to which the packet is sent. Output port 730 specifies the output port allocated to receive the packet.

Row 630 indicates that for control and user data sent with destination IP of SGWIP1, output port 130-1 is allocated to receive such data. Row 631 indicates that for control and user data sent from (that is, with the source IP of) SGWIP1, output port 130-1 is allocated to receive such data. Similarly, rows 632-633 show other IP addresses (of SGWIP2) and the corresponding destination output ports in the 3G network.

FIG. 6E depicts a dynamic rules table, which is maintained to indicate the dynamic allocation of subscriber sessions to respective output ports according to an aspect of the present disclosure. The dynamic rules in FIG. 6E operate to override the default rules of FIG. 6D and to force packets having specific tunnel endpoints to respective output ports.

As shown, dynamic GCL table 584 contains columns 690-693. Source IP address 690 specifies the IP address of the source network element from which the packet is sent, while destination IP address 691 specifies the IP address of the destination network element to which the packet is directed. Tunnel Endpoint Identifier (TEID) 692 specifies the endpoint identifier assigned by the network elements while creating the corresponding data sessions. Output port 693 specifies the output port allocated to receive the packets.

Rows 640-643 indicate the dynamic rules mapped to various tunnel endpoints in the network. Row 640 indicates that the dynamic rule allocates incoming data directed at tunnel endpoint TEID3 (with destination IP address of ENBIP1) to be sent to output port 130-1. Similarly, for user data sent with the respective tunnel endpoints (e.g., TIED4) shown in rows 641-643, dynamic rules allocate the corresponding destination output ports to 130-1 as well.

According to an aspect of the present disclosure described in detail in below sections, dynamic rules are used to ensure that the tunnel endpoints of the control session and the tunnel endpoints of the data session of a particular user are allocated to the same output port. It may be observed in FIG. 6D, the IP addresses of endpoints of the control session (represented by SGWIP1 as the IP address for SGW) are allocated to port 130-1, whereas the IP addresses of endpoints of the data sessions (represented by SGWIP2 as the IP address for SGW) are mapped to port 130-2. However, router controller 104 configures dynamic rules in dynamic GCL table 584 to force packets of the data session to the same output port as that of the control session shown in FIG. 6D, i.e., output port 130-1.

It may be appreciated that the above noted tables in packet router 102 are maintained/updated by router controller 104 such that network visibility system 100 provides several aspects of the present invention. In real-world implementations, network visibility system 100 is responsible for processing a large number of packets (e.g., order of millions per second), flowing through the 3G (106) and 4G/LTE (108) networks, with many of those packets (or relevant portions of such packets) being mirrored to the router controller 104 for determining forwarding rules.

Router controller 104 may also accordingly need to be implemented to support aspects such as scalability and fail-safe (i.e., back-up processing in case some of the components fail) processing. Several aspects of the present disclosure provide an architecture for router controller 104 meeting one or more of such requirements, as described below in further detail.

9. Scalable and Fail-Safe Architecture of Router Controller

Figure 7A:
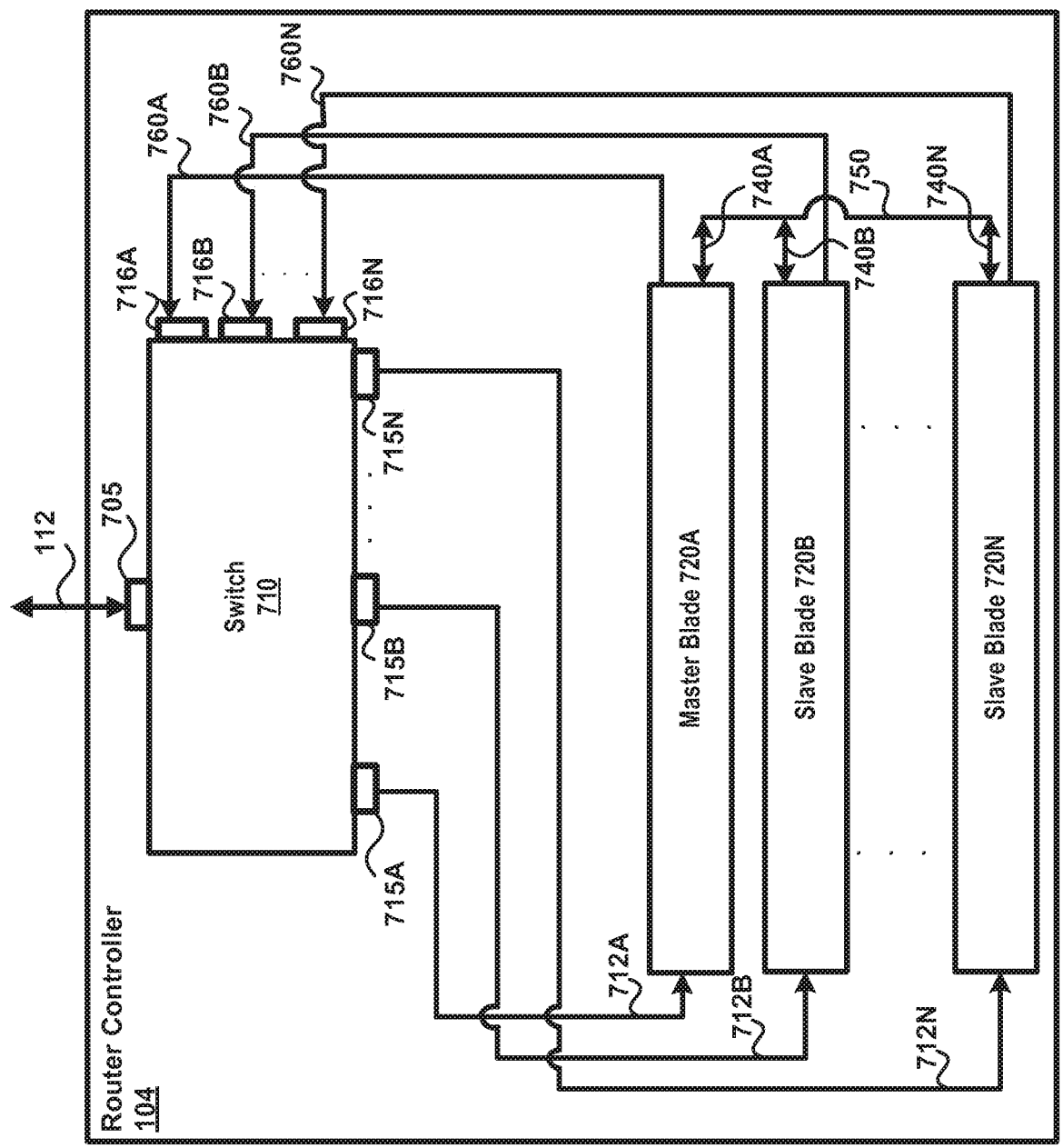
FIG. 7A is a block diagram of a router controller, in an embodiment of the present disclosure.

FIG. 7A depicts a high-level architecture of a router controller, in an embodiment of the present disclosure. Router controller 104 is shown containing switch 710, master blade 720A, and slave blades 720B-720N.

Switch 710 is configured to receive one or more packets and to forward the received packets to one or more server blades for further processing. Switch 710 is shown with input port 705 and output ports 715A-715N. As noted earlier, mirrored stream of GTP-C traffic is sent from packet router 102 via path 112 via mirror port 571 of FIG. 5) of router controller 104. The mirrored stream of GTP-C traffic is received by router controller 104 at input port 705.

Switch 710 is configured with one or more routing tables, and distributes incoming packets to the various output ports 715A-715N based on distribution rules configured in the routing tables. For example, the routing tables may maintain rules based on IP addresses of incoming packets. Accordingly, incoming packets with IP addresses (source or destination) that fall in a particular range may be forwarded to one output port, while incoming packets with IP addresses that fall in a different range may be forwarded to another output port.

Alternatively (or in addition), routing tables may maintain rules based on zone VLAN IDs, which are described with reference to FIGS. 6A and 6B above. In general, switch 710 can be operative based on any rules such that packets are distributed among the various output ports (for load balancing among the blades), while providing for load balancing among the blades 720A-720N.

In operation, GTP-C traffic is received by router controller 104 via path 112 on input port 705. Thereafter, switch 710 distributes the incoming packets to the various output ports 715A-715N based on distribution rules maintained in one or more routing tables stored in switch 710. The packets are then forwarded to corresponding server blades 720A-720N via respective paths 712A-712N for further processing.

Each of server blades 720A-720N represents a controller block that accepts incoming packets (e.g., GTP-C packets) from switch 710, processes the packets to generate forwarding rules, and programs the forwarding rules into packet router 102's tables via switch 710. Accordingly, each of the controller blocks may be implemented as a desired combination of hardware, software and firmware, as will be apparent to one skilled in the relevant arts by reading the disclosure provided herein.

In the embodiments described herein, the controller blocks are shown using server blades. However, one skilled in the relevant arts will recognize that any other type of controller blocks (e.g., virtual machines implemented on a single server, other types of processing entities such as rack servers) may be implemented without deviating from the scope and spirit of the present disclosure.

Each of the server blades 720A-720N contains one or more processors with a corresponding local memory unit. The server blades are commonly provided within a blade server, even though multiple blade servers can be employed for further scalability.

Immediately after initial boot-up (i.e., before being operational), router controller 104 assigns one of the server blades (e.g., the blade that establishes communication with switch 210 first) as the 'master' blade, and the remaining server blades as 'slave' blades. In the example of FIG. 7A, server blade 720A is assigned as the master blade, and all remaining servers 720B-720N are assigned as slave blades. Upon failure of a master blade, one of the operational server blades is designated as the master blade by router controller 104.

Thus, upon being designated as a master blade at initial boot-up, master blade 720A configures initial (packet) forwarding rules available based on user configurations and/or prior operation (and retrieved from a non-volatile memory, not shown). Thereafter, master blade 720A programs the initial forwarding rules in the tables of packet router 102 by sending the rules via path 760A and input port 716A, through switch 710, and via path 112 to packet router 102.

Master blade 720A maintains a copy of the initial forwarding rules locally in its memory, and synchronizes ("syncs") a copy of the initial forwarding rules with the remaining slave blades 720B-720N by sending the initial forwarding rules via path 740A, on bus 750, to each of the slave blades 720B-720N. Therefore, after the synchronization of the initial forwarding rules, each of the server blades 720A-720N maintain the same copy of the initial forwarding rules as are present in the packet router 102.

Thereafter, each server blade (master and slaves) receives packets from switch 710 based on the distribution rules configured in the routing tables maintained in switch 710. Upon processing the received packets, each of the server blades 720A-720N may generate additional rules based on the processed packets.

Each of the server blades 720A-720N programs the corresponding forwarding rules in the tables of packet router 102 (via corresponding paths 760A-760N, through switch 710, and via path 112), and maintains a copy of the forwarding rules locally in memory. As with the initial forwarding rules, these additional generated forwarding rules are synced with the remaining server blades via a corresponding paths 740A-740N on bus 750.

Thus, upon completion of synchronization, all of the blades 720A-720N has the same view of the programmed rules (in router 102) and each of the blades 720A-720N can process any of the control packets received from switch. Accordingly, switch 710 can be implemented with any distribution rules that operate to balance the load across different blades 720A-720N. In other words, switch 710 can send any received packet to any of the blades 720A-720N, and can therefore distribute the load among the blades based on any distribution approaches. In an embodiment, the distribution of the load is based on VLAN IDs or 'zones', such that switch 710 forwards mirrored GTP-C packets originating or terminating in a first zone to a first one of blades 720A-720-N, while forwarding mirrored GTP-C packets originating or terminating in a second zone to a second one of blades 720A-720-N.

Figure 7B:
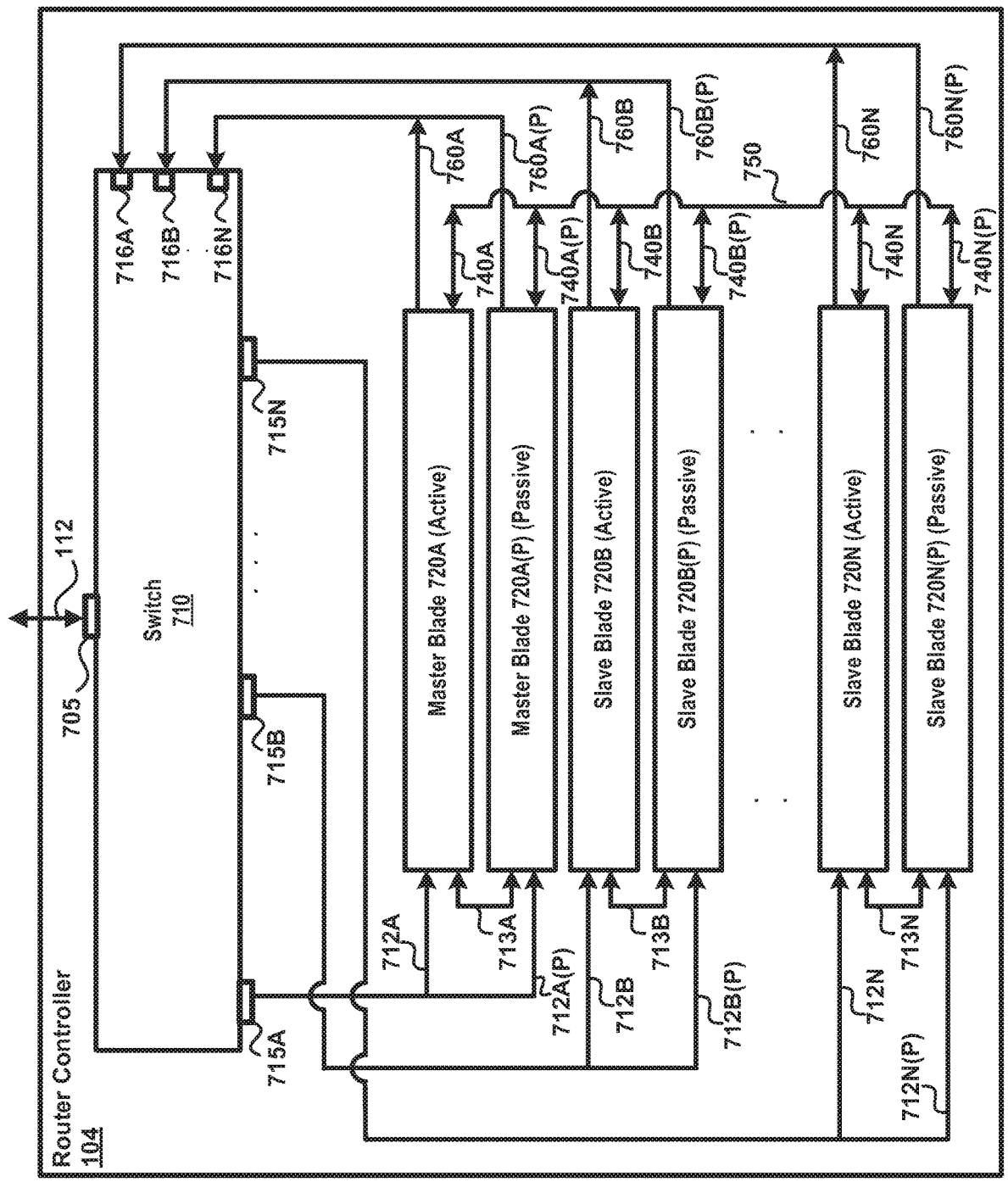
FIG. 7B is a block diagram of a router controller, in an alternative embodiment of the present disclosure.

FIG. 7B depicts an alternative architecture of the router controller, in an embodiment of the present disclosure. Router controller 104 is shown containing switch 710, master blade 720A, slave blades 720B-720N, and passive blades 720A(P)-720N(P). Each of input path 112, input port 705, switch 710, master blade 720A and slave blades 720B-720N perform similar function as the corresponding component described in FIG. 7A, and their description is not repeated for conciseness.

Additionally, FIG. 7B shows that each of the server blades 720A-720N has an associated passive server blade, denoted with a suffix (P), identified as passive server blades 720A(P)-720N(P). Passive server blades 720A(P)-720N(P) each represent a controller block similar to the controller blocks represented by their 'active' counterparts 720A-720N. The passive server blades remain inactive (i.e., passive) as long as their counterpart active servers remain operational. However, a passive blade computes the rules independently (along with the paired active blade) even when in 'passive mode' so that the rules are readily available upon switching to active mode. A passive blade does not send forwarding rules to packet router 102 until/unless the passive blade takes on the role of the active blade (i.e., becomes operational).

The pairs of blades may be implemented with appropriate communication protocol, for example, shown as paths 713A-713N, such that only one of the blades takes on active role, and the other the passive (non-operational) role at any given time instance. When the active blade becomes non-operational, the passive blade switches role to thereafter operate as the active blade.

It may be observed that both the blades of a pair receive packets via the same output port of switch 2710. Due to such a feature and redundancy for the individual blades, switch 710 can continue to operate with the same switching rules, irrespective of which of the blades of the pair is operating as the active blade.

When blades 720A-720N configure the initial forwarding rules, or generate additional rules (by examination of control packets), such rules are programmed in packet router 102 via corresponding paths 760A-760N and input ports 716A-716N, through switch 710, and via path 112. Further, such rules are also synced with the remaining server blades, via corresponding paths 740A (P)-740N (P) on bus 250.

Therefore, even when passive server blades 720A(P)-720N(P) are not active, each of the passive server blades are synchronized with the remaining server blades such that the passive server blades have the same view of the forwarding rules as the active server blades.

As noted previously, when the active blade becomes non-operational, the passive blade switches role to thereafter operate as the active blade. The distribution rules in switch 710 need not be modified, as the now-operational passive blade simply accepts the packets that were previously destined for the non-operational active server (via paths 712A (P)-712N (P)).

Further, any additional rules generated by the passive (now operational) server are programmed in packet router 102 in a similar fashion as described above with respect to the active server blades (i.e., via corresponding paths 760A (P)-760N (P) and input ports 716A-716N, through switch 710, and via path 112 for updates to the router, and via corresponding paths 740A (P)-740N (P) on bus 250 for syncing with the remaining server blades). If the active server associated with the passive server returns to operational status at a future point in time, the passive server may switch role to become non-operational again such that all packets are processed by the now operational active server.

Therefore, in operation, when GTP-C traffic is received by router controller 104 via path 112 on input port 705, switch 710 distributes the incoming packets to the various output ports 715A-715N based on rules maintained in one or more routing tables stored in switch 710. The packets are then distributed to corresponding server blades 720A-720N via respective paths 712A-712N for further processing. Configuration of the initial forwarding rules, as well as additional rules is done by the server blades via switch 710.

Further, the forwarding rules are synced with remaining server blades via a common bus. If an active server becomes non-operational, an associated passive server switches role as the active server, and the incoming packets destined to the non-operational server are distributed to the passive server without modifying distribution rules in the switch, until such time that the active server returns to operational status.

Though not shown, various components of router controller 104 (including blades 720A-720N and switch 710), may be driven by software instructions provided from a non-volatile storage media/medium. The instructions may be retrieved into random access memories (for superior performance) and executed by the processors to provide various features described above, including (one or more of) distributing packets based on distribution rules, and syncing forwarding rules between blades 720A-720N.

It may thus be appreciated that for achieving high throughput performance, router controller 104 may implement a scalable active-active server blade architecture (containing multiple active blades) that performs packet processing in a load-sharing way. Further, for high-availability (or fail-safe) processing of packets, router controller 104 is shown employing corresponding passive components.

The description is continued with respect to the details of an embodiment of master blade 720A, which generates forwarding rules in accordance with several aspects of the present disclosure.

10. Details of Master Blade in Router Controller

Figure 8:
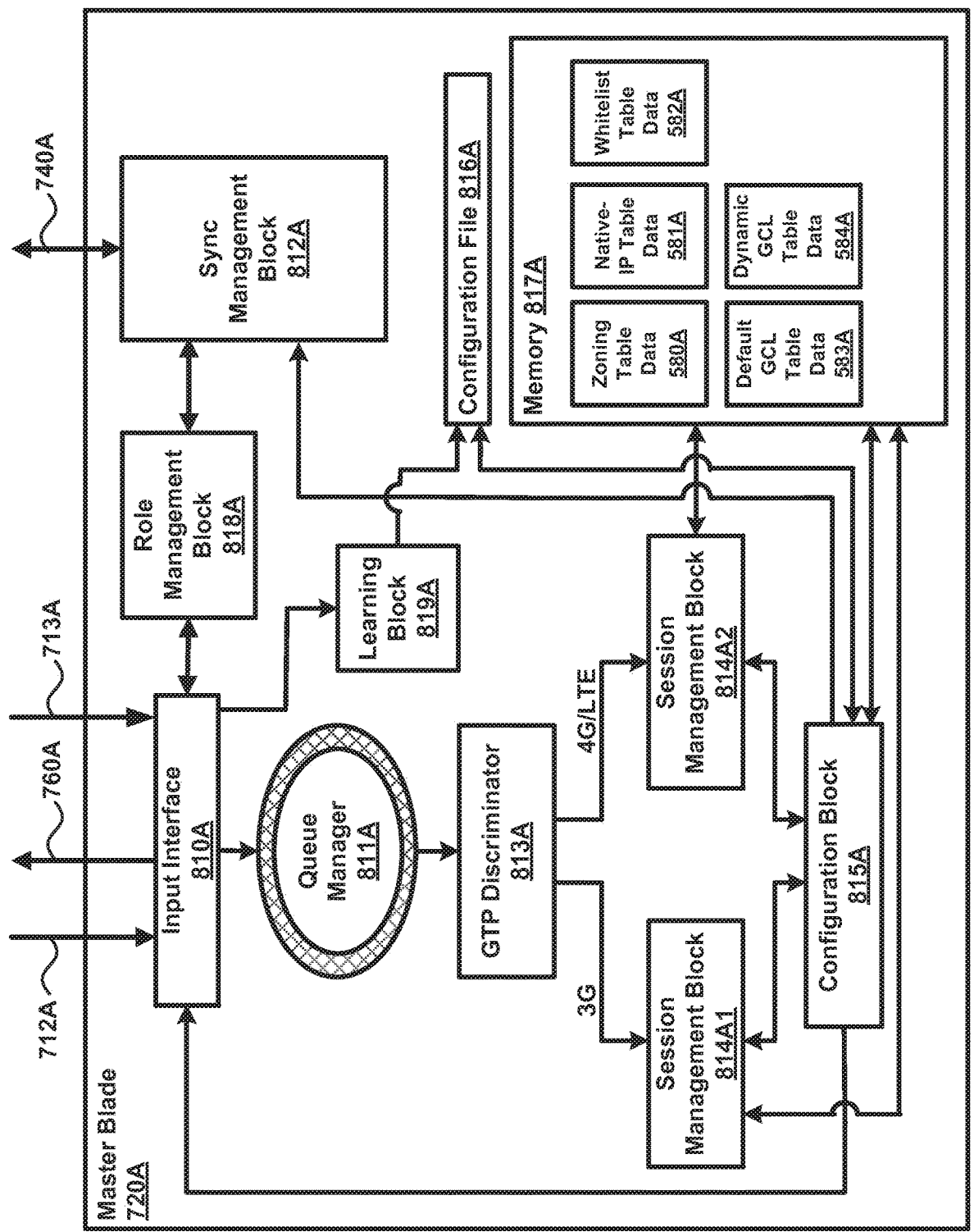
FIG. 8 is a block diagram illustrating the internal details of a server blade implementing a router controller, in an embodiment of the present disclosure.

FIG. 8 is a block diagram illustrating the internal details of a server blade, in an embodiment of the present disclosure. Although the details of a server blade are illustrated with respect to the master blade 720A, it would be apparent to those skilled in the art by reading the disclosure herein that the slave blades 720B-720N and the passive blades 720A(P)-720N(P) operate in a similar fashion as master blade 720A, unless otherwise indicated. For example, at the time of initial boot-up, master blade configures the initial forwarding rules, and programs the initial forwarding rules in the tables of packet router 102. Master blade maintains a copy of the initial forwarding rules (or that part of the information needed to reconstruct the tables, in general) locally in its memory, and syncs a copy of the initial forwarding rules with the remaining slave blades.

As described above with reference to FIG. 7A, after the initial assignment of master and slave blades and the configuration of the initial forwarding rules, each server blade receives packets from switch 710 based on distribution rules configured in switch 710.

Input interface 810A represents a communication interface to enable communication between various blocks of master blade 720A and packet router 102 via switch 710, and between master blade 720A and the remaining blades. In general, packets received by master blade 720A (via path 712A) are examined by input interface 810A for forwarding to appropriate internal block (e.g., 811A, 818A, 819A). Similarly, input interface 810A sends packets (via path 760A) directed to external elements such as packet router 102 upon receipt of the corresponding packets from the respective internal block (e.g., 815A). Further, input interface 810A, via path 713A, operates to communicate the operational status of the master blade 720A, as well as to receive the operational status of the corresponding passive server blade 720A(P) in cooperation with role management block 818A.

Input interface 810A forwards GTP and non-GTP/native-IP packets received from learning port 516 (of FIG. 5, and via switch 710) to learning block 819A. As noted above, such packets are newly discovered packets which 'currently' do not have any matching entries in zoning table 580 and native-IP table 581. It is assumed herein that switch 710 also forwards (in addition to the packet itself), to each of the blades in router controller 104, information regarding which ones of ports 561, 563 and 571 the forwarded packet was received on. With such information, input interface 810A can forward the received packet to the appropriate one of blocks 811A, 818A and 819A. Learning block 819A parses each of the received packets (GTP as well as non-GTP/native-IP) and stores the IP address(es) contained in the packet, as well as the node type that the IP address belongs to, in configuration file 816A.

Role management block 818A pings (via path 713A) passive blade 720A(P) to ascertain the operational status of the passive blade 720A(P). Similarly, a corresponding role management block 818A (P) (not shown) in passive blade 720A (P) pings master blade 720A regarding the operational status of the master blade 720A. As described above, if passive blade 720A(P) learns of the master blade 720A being non-operational, passive blade 720A(P) switches role and assumes the role of the master blade 720A. Role management block 818A sends the operational status (i.e., the state) of the corresponding passive blade 720A (P) to sync management block 812A on a periodic basis.

Sync management block 812A maintains a state table (not shown) that stores the operational status of the various blades in router controller 104. For example, if master blade 720A becomes non-operational, such event is communicated by the sync management block of the passive blade 720A(P) (via path 740A (P) to bus 250 as shown in FIG. 7B) to remaining server blades in router controller 104 such that the corresponding state tables in the sync management blocks of the remaining (operational) servers are updated with the master blade's non-operational status.

Further, sync management block 812A receives the configured forwarding rules from configuration block 815A and updates remaining blades 720B-720N (and additionally, in the embodiment of FIG. 7B, passive blades 720A(P)-720N(P)) with such rules. Specifically, when configuration block 815A configures initial forwarding rules in zoning table 580, the native-IP table 581, whitelist table 582, and default GCL table 583 (at boot-up), it sends a copy of the initial forwarding rules to sync management block 812A. Sync management block 812A then syncs a copy of the initial forwarding rules with the remaining blades via path 740A (to bus 250) such that the data saved by master blade 720A in memory 817A is always synced with the remaining blades in router controller 104.

Similarly, when additional rules are generated (e.g., via the addition of newly discovered IP addresses), configuration block 815A sends a copy of such forwarding rules to sync management block 812A. Sync management block 812A then syncs a copy of such rules with the remaining blades via path 740A (to bus 250) in router controller 104.

Accordingly, the current data maintained in the zoning table 580, the native-IP table 581, whitelist table 582, default GCL table 583, and dynamic GCL table 584 of packet router 102 is synced with all server blades in router controller 104 such that failure of any one server blade does not impact the operation of the router controller 104.

In the context of packets sent from packet router 102 on path 571, input interface 810A receives the packets and forwards them to queue manager 811A. Queue manager 811A receives control packets from input interface 810A and places the packets in a queue before further processing by GTP discriminator 813A (e.g., on a first-in-first-out basis). Master blade 720A receives a large number of packets (e.g., GTP-C control packets) for processing, and as such queue manager 811A buffers the packets in one or more queues prior to retrieval by GTP discriminator 813A.

GTP discriminator 813A retrieves packets from queue manager 811A and distributes the packets to session management blocks 814A1 or 814A2 based on whether the incoming packet is a 3G network packet or a 4G/LTE network packet respectively. In an embodiment, GTP discriminator 813A identifies 3G and 4G/LTE packets based on a version field contained in the GTP header of the received GTP packets, as is well known in the relevant arts.

Session management blocks 814A1 and 814A2 (collectively "block 814A") process 3G and 4G/LTE packets respectively. Session management block 814A operates to ensure that GTP-C and GTP-U packets of the same user session continue to be directed to the same output port, as described in below sections.

Configuration block 815A configures the initial forwarding rules, and additional rules in corresponding tables on packet router 102. Zoning table 580, Native-IP table 581, whitelist table 582, default and dynamic GCL tables 583 and 584 of packet router 102 may be implemented in the form of CAMs (content addressable memory). Configuration block 815A maintains a list of the available hardware resources of packet router 102, e.g., the number of operational service cards and the number of operational output ports. Configuration block 815A maintains a count of the total number of CAM entries (an example format for an entry in a default GCL table is shown in FIG. 6D) for each of the tables which currently have valid entries, as well as the total number of CAM entries available per table.

Additionally, upon receiving dynamic GCL rules from session management block 814A, configuration block 815A sends the dynamic forwarding rules to switch 210 via input interface 810A and path 760A. The dynamic rules are sent from switch 210 to packet router 102 via service port 573 (shown in FIG. 5), for corresponding updates to be made to the dynamic GCL table.

Configuration block 815A also stores a copy of the initial forwarding rules, and additional rules in memory 817A. The saved data (i.e., the forwarding rules) associated with the zoning table 580, the native-IP table 581, whitelist table 582, default GCL table 583, and dynamic GCL table 584 is shown represented as zoning table data 580A, the native-IP table data 581A, whitelist table data 582A, default GCL table data 583A, and dynamic GCL table data 584A respectively in memory 817A. Configuration block 815A further sends each of the configured forwarding rules (stated above) to sync management block 812A on a periodic basis (e.g., after configuring each rule).

Configuration file 816A (which may be part of memory 817A, although shown separately) stores the IP addresses of network elements (such as those shown in FIGS. 2 and 3), which are used for configuring zoning table 580, native-IP table 581, and default GCL table 583 of packet router 102. Configuration file 816A is only operative within the context of the master blade 720A. As described above, the task of configuring the initial forwarding rules by examining the configuration file 816A is done by the master blade 720A and synced with the remaining blades 720B-720N. It may be appreciated that some of the entries in configuration file 816A may be user configured, while more entries are added by operation of features of the present disclosure, even though all the IP addresses can be discovered in accordance with the features described herein.

Configuration file 816A may also contain entries indicating a mapping of specific IP network addresses to the corresponding VLAN IDs and also the specific node type the specific IP addresses of such network addresses may be allocated to. Such information may be provided by the network administrators based on the knowledge of IP address allocations to different node types in various networks and geographies. The mapping is used in providing the appropriate values for various rows of FIG. 6A in relation to column 653. As described above, the VLAN ID value determines the specific service instance/card to which corresponding packets are to be forwarded.

The description is continued with respect to the initial (boot-up/power up) operation of master blade 720A (in particular configuration block 815A) in one embodiment.

11. Configuring Initial Forwarding Rules

When packet router 102 is powered up, configuration block 815A reads the user-configured rules in configuration file 816A and runs algorithms to determine whether there is capacity available in the CAM memory to program the corresponding rules. Configuration block 815A also validates the rules by performing validation checks on various fields in the rules (e.g., ingress/egress ports and protocol). Thereafter, configuration block 815A configures, via input interface 810A and path 760A, the zoning table 580, the native-IP table 581, whitelist table 582, and default GCL table 583 in packet router 102 based on the entries already present in configuration file 816A.

In an embodiment, with respect to the zoning table 580, configuration block 815A first identifies the set of all relevant IP addresses from configuration file 816A. Assuming there are 'n' service cards (e.g., 506A-506N), configuration block 815A creates 'n' sets of IP addresses (e.g., by dividing the set of all relevant IP addresses by a factor of 'n') and assigns each set of IP addresses to a corresponding one of the 'n' service cards. Thereafter, configuration block 815A configures forwarding rules corresponding to each set of IP addresses in the zoning table 580 of packet router 102, to cause packets with the corresponding IP addresses to be forwarded to a corresponding service card (i.e., 506A-506N).

With respect to native IP table 581, assuming there are 'p' output ports (shown as 130-1 to 130-P in FIG. 5), and assuming all 'p' output ports can process each incoming packet, configuration block 815A creates 'p' sets of IP addresses from the set of all relevant IP addresses in the configuration file 816A, and assigns each set of IP addresses to a corresponding one of the 'p' output ports. Thereafter, configuration block 815A configures the forwarding rules in the native IP table 581 of packet router 102 to distribute the load among the output ports.

With respect to whitelist table 582, configuration file 815A identifies all the whitelisted IP addresses configured by the user in configuration file 816A and programs corresponding forwarding rules based on such IP addresses in the whitelist table 582. In one embodiment, all packets originating from or destined to the whitelisted IP addresses are dropped by the packet router 102. The whitelisted IP addresses are typically configured by the user in the configuration file 816A either in the form of static IP addresses or in the form of domain names, which are dynamically converted into IP addresses by the configuration block 815A prior to programming the forwarding rules in the whitelist table 582.

With respect to default GCL table 583, as described earlier, each service card 506A-506N is assigned a set of IP addresses in the zoning table 580. Packets received at the corresponding service card are forwarded to an output port for further processing, based on forwarding rules in the default GCL table 583. Accordingly, assuming there are 'p' output ports, and assuming all 'p' output ports can process each incoming packet, configuration block 815A creates 'p' sets of IP addresses from the set of IP addresses assigned to each service card, and assigns each set of IP addresses to a corresponding one of the 'p' output ports. Thereafter, configuration block 815A configures the forwarding rules corresponding to each set of IP addresses to a corresponding output port (i.e., 131-1 to 131-P) in default GCL table 583 of packet router 102 such that packets are distributed among the various output ports in a proportional manner.

For example, assuming there are 600 IP addresses that need to be distributed between two service cards and six output ports. In an embodiment, configuration block 815A first configures forwarding rules (in the zoning table 580) assigning a set of 300 IP addresses to the first service card, and assigning another set of 300 IP addresses to the second service card. Thereafter, the 600 IP addresses are equally distributed among the 6 output ports (at 100 IP addresses each) in default GCL table 583 such that packets with the corresponding IP addresses are forwarded to a corresponding output port.

In one embodiment, configuration block 815A computes the total number of IP addresses that are to be assigned to a single output port (equal to the number of incoming IP addresses divided by the number of output ports) and then distributes the total number of IP addresses equally among all the service cards. In the above examples, configuration block 815A creates 6 sets of IP addresses (50 each=total number of IP addresses to be assigned to each output port/number of service cards=100/2) that are each assigned to a corresponding one of the 6 output ports. Accordingly, a single output port is assigned 50 IP addresses each from each of the two service cards, for a total of 100 IP addresses assigned per port from both the service cards.

The initial forwarding rules are sent from switch 710 to packet router 102 via control port 563 (shown in FIG. 5). While the initial set of IP addresses may be provided by configuration file 816A, newly discovered IP addresses (from subsequent GTP packets) are configured by configuration block 815A and forwarding rules corresponding to the newly discovered IP addresses are thereafter dynamically added to zoning table 580, as described below with examples.

12. Discovering IP Addresses

According to an aspect of the present disclosure, ingress card 502 in packet router 102 forwards non-matching packets (those not matching any of the rules/rows in native-IP table 581 and zoning table 580) on learning port 561 to router controller 104. As noted above, the non-matching packets may include GTP as well as non-GTP/native-IP packets. Learning block 819A (in router controller 104) parses each received GTP and non-GTP/native-IP packet to identify IP addresses and stores the identified IP addresses contained in the packet (as well as the node type to which the IP address belongs) in configuration file 816A. The manner in which various packets can be examined/parsed for determining the IP addresses for corresponding node types, is noted below in Appendix A, and learning block 819A implements the packet-parsing logic described in Appendix A.

FIG. 9 depicts sample IP addresses discovered during operation of packet router 102 in an embodiment. As shown, table 900 contains columns 910 and 920. IP address (column) 910 specifies the newly discovered IP address, while node type 920 specifies the type of the node (from which the packet was received). Rows 951-954 respectively indicate respective combinations of IP addresses and node types discovered by learning block 819A.

Based on the discovered (and stored) IP addresses and the corresponding node types, configuration block 815A may verify if node types and their corresponding IP addresses as specified by a network operator (via a configuration file (e.g., 816A)) match. For example, configuration block 815A may determine if source and destination IP addresses (which may have been obtained from a network operator) in table 580 of FIG. 6A do indeed correspond to that of an SGW or not. If the discovered IP address/type is inconsistent with IP address/type used earlier in any of the forwarding tables, router controller 104 may automatically re-create the corresponding entries to correct the error or remove any such erroneous entries from table 580.

Configuration block 815A may use the newly discovered IP addresses (stored by learning block 819A in configuration file 816A) to configure zoning table 580, native-IP table 581, and default GCL table 583. For example, configuration block 815A includes the newly discovered IP addresses in the identified set of all relevant IP addresses (noted above), and then sets up zoning table 580 such that the newly identified set (including the discovered IP addresses) are equally distributed among the existing ('n') service cards. Similar to the operations with respect to zoning table 580, forwarding rules for newly discovered IP addresses are distributed among the various output ports in a proportional manner in native-IP table 581 and default GCL table 583.

Configuration block 815A sends the additional rules (generated based on discovered IP addresses) to switch 710 via input interface 810A and path 760A. The additional rules are sent from switch 710 to packet router 102 via control port 563 and service port 573 (shown in FIG. 5), for corresponding updates to be made to zone table 580, native-IP table 581 and default GCL table 583 in service card 506A. It may be appreciated that though some of the entries in configuration file 816A may be user-configured (with more entries added by operation of features of the present disclosure), in alternative embodiments, all the IP addresses can be discovered in accordance with the features described herein.

Thus, by having router controller 104 discover new IP addresses and generate forwarding rules based on the newly discovered IP addresses, the formation of forwarding rules is simplified. The description is continued with respect to another aspect of the present disclosure.

13. Configuring Dynamic Filters

As noted above, an aspect of the present disclosure enables router controller 104 to configure dynamic filters which ensure that control (GTP-C) and user (GTP-U) packets of the same user session continue to be directed to the same output port (and thus to the same analytic server). Such configuration may be necessitated when the packets received from the same user have different associated IP addresses.

For example, in 4G/LTE network 108 (FIG. 3), each SGW (320-1 through 320-Q) is often addressable by one set of addresses on the path connected to MME and another set of addresses on the path connected to ENB. In addition, even on the path to a single ENB, the SGW may be addressable by several IP addresses. Thus, SGW is addressable by many IP addresses. Similarly, GGSN of 3G network may also be addressable by many IP addresses. Therefore, there may be situations where user data packets and the control packets belonging to the same user address the same GGSN/SGW with different IP addresses.

FIGS. 10A and 10B respectively depict control and data sessions being formed between two network elements MME 350-1 and SGW 320-1. Referring to FIG. 10A, it is assumed that user equipment 301 requests a new control session to be established with SGW 320-1, prior to sending data to a server connected to Internet 360. The request for a control session is communicated from user equipment 301 to MME 350-1 via ENB 310-1. Upon receiving the request, MME 350-1 initiates communication with SGW 320-1 via a "create session request" message. The create session request message includes the IP address of MME 350-1, shown as MMEIP1, as well as the tunnel endpoint identifier (TEID) of MME 350-1, shown as TEID1. MMEIP1 and TEID1 indicate to SGW 320-1 that when sending a response to the create session request message, or when sending any future control messages to MME 350-1 for that particular user equipment 301, SGW 320-1 must use tunnel endpoint MMEIP1 and TEID1 for that particular control session.

Upon receiving the create session request message, it is assumed that SGW 320-1 returns a create session response message with the cause code as "request accepted". As with MME 350-1, SGW 320-1 also sends its IP address and TEID (i.e., SGWIP1, and TEID2 respectively) to indicate acceptance of the create session request message, as well as to indicate to MME 350-1 that when sending any future control messages to SGW 320-1, MME 350-1 must use the tunnel endpoint SGWIP1 and TEID2 to identify SGW 320-1 for that particular control session.

Once the corresponding IP addresses and TEIDs are exchanged between MME 350-1 and SGW 320-1, a control session 1010 is established with TEIDs of TEID1 and TEID2 at the respective ends of the tunnel.

Referring to FIG. 10B, it is assumed that the user equipment 301, which initially requested the control session to be established (as shown in FIG. 10A), requests two data sessions to be created to stream data (e.g., a first data channel to stream audio and a second data channel to stream video). The request for data sessions is sent on the same control session 1010 that was shown created previously in FIG. 10A.

Upon receiving the request (via ENB 310-1), MME 350-1 initiates communication with SGW 320-1 via a "modify bearer" message, which is a message sent to request the establishment of data channels between SGW 320-1 and ENB 310-1. The modify bearer message identifies the IP address and the TEID of SGW 320-1 assigned during the creation of the control session (as shown in FIG. 10A), as well as the IP address of ENB 310-1, shown as ENBIP1, and the TEIDs of two requested channels assigned by ENB 310-1, shown as TEID 3 and TEID 5. ENBIP1 and TEID3 indicate to SGW 320-1 that when sending a response to the modify bearer message (i.e., to create the first data session), or to send any future messages on the first data session, SGW 320-1 must use the tunnel endpoint ENBIP1 and TEID3 to identify ENB 310-1. Similarly, SGW 320-1 must use the tunnel endpoint ENBIP1 and TEID5 to identify ENB 310-1 for the second data session.

Upon receiving the modify bearer message, it is assumed that SGW 320-1 returns a modify bearer response message with cause code as "request accepted". As with MME 350-1, SGW 320-1 also sends its IP address and TEIDs (i.e., SGWIP2, and TEID4 and TEID6 respectively) to indicate acceptance of the modify bearer message (thereby forming the corresponding two data sessions), as well as to indicate to ENB 310-1 that when sending future data to SGW 320-1, ENB 320-1 must use the tunnel endpoints SGWIP2/TEID4, and SGWIP2/TEID6 to identify SGW 320-1 for the corresponding first and second data channels respectively.

Although the tunnel endpoint information is shown being received in a separate modify bearer message, it would be evident to one of ordinary skill in the art by reading the disclosure herein that the tunnel endpoint information of the modify bearer message may be communicated on the same create session request message shown in FIG. 10A.

It may be appreciated that configuration block 815A may specify forwarding rules in default GCL table 583 of packet router 102 to reflect the scenarios shown in FIGS. 10A and 10B. For example, default GCL table 583 of FIG. 6D is shown indicating for each IP address associated with SGW 320-1 in the 4G/LTE network, a corresponding output port to which the IP address is mapped to. For illustration, only the tunnel endpoints of SGW 320-1 are shown. However, it will be understood by reading the disclosure herein that default GCL table 583 may also maintain tunnel endpoint information associated with other SGW nodes in 4G network 108 and/or GGSN 240-1 through 240-M in 3G network 106.

In particular, row 630 of FIG. 6D indicates that the destination IP address SGWIP1 is shown mapped to the output port 130-1 (corresponding to control session 1010 being formed in FIG. 10A between MME 350-1 and SGW 320-1). In row 632, the destination IP address SGWIP2 is shown mapped to a different output port 130-2 (corresponding to data sessions being formed in FIG. 10B between ENB 310-1 and SGW 320-1). As may be appreciated from FIG. 6D, the IP addresses of endpoints of the control session are allocated to port 130-1, whereas the IP addresses of endpoints of the data sessions are mapped to port 130-2 thereby causing the control and user packets received from the single user to be forwarded to different output ports, and correspondingly to different analytic servers.

Referring again to FIG. 8, session management block 814A2, upon receiving the copy of a GTP-C packet, decodes/parses the packet (e.g., to determine the IP address associated with the SGW) and dynamically determines, by examining the corresponding entries in default GCL table data 583A (which stores a copy of the data shown in FIG. 6D), whether destination IP addresses associated with the control session and the data session of a user are allocated to the same output port. If it is determined that GTP traffic for the data and control sessions associated with the current GTP-C packet will still be sent to the same output port, then session management block 814A2 does not take any further action.

However, if session management block 814A2 determines that GTP traffic for the data and control sessions associated with the current GTP-C packet will not still be sent to the same output port (as in the scenario depicted in FIG. 6D), then session management block 814A2 determines a new dynamic GCL entry to force all of the user data and control data associated with the current GTP-C packet to the same output port. Session management block 814A then causes (via configuration block 815A) the dynamic GCL entry to be programmed into the dynamic GCL table 584 of service card 506A via service port 573. Thus, all subsequent control and data packets for the same user session are forwarded based on the new entry to the same output port (and correspondingly to the same analytic server).

With respect to the rules shown in FIG. 6D, session management block 814A2 configures dynamic rules in dynamic GCL table 584 (shown in FIG. 6E) to force packets of the data session to the same output port as that of the control session shown in FIG. 6D, i.e., output port 130-1. Accordingly, for the tunnel endpoint shown in row 640 of FIG. 6E, the dynamic rule allocates incoming data directed at that tunnel endpoint to be sent to output port 130-1. Similarly, for user data sent with tunnel endpoints shown in rows 641-643, dynamic rules allocate the corresponding destination output ports to 130-1 as well. Therefore, for particular user equipment 401, the tunnel endpoints of the control session and the data session are allocated to the same output port.

Thus, by creating appropriate dynamic filters and updating dynamic GCL table 584 with the created filters, router controller 104 ensures that the analysis of all packets of a single user is a performed by the same analytic server 110-1 to 110-P. Although the description of FIGS. 6D-6E and 10A-10B is shown with respect to the 4G/LTE network, aspects of the present disclosure are equally applicable to 3G networks.

For example, in 3G networks, control and data sessions are created between GGSN and SGSN nodes, with tunnel endpoints forming between the respective pairs of nodes. This allows the SGSN to activate a control or data session on a user's behalf or deactivate the same session. Similarly, GGSN may be utilized to activate or deactivate sessions on behalf of an external server sending data directed at the user equipment (e.g., user equipment 201-202). In such cases, the information stored in the default and dynamic rules tables would reflect the tunnel endpoints of the corresponding nodes (typically the GGSN) as applicable in the 3G network context.

Similar to as in 4G/LTE networks (although not necessarily), a GGSN may contain two interfaces, each with different IP addresses. A control session packet from SGSN may be forwarded to one interface (i.e., one IP address and a corresponding TEID) of the GGSN, while data sessions (associated with the control session) from SGSN may be forwarded on the second interface (i.e., second IP address and with corresponding TEIDs for each data session). Therefore, similar to that as noted above with respect to 4G/LTE networks, if session management block 814A2 determines from the default table 583 that packets of the control and the associated data sessions are not programmed to be forwarded to the same output port, then session management block 814A2 creates a new dynamic GCL entry (in dynamic GCL table 584) to force packets of the control and data sessions to the same output port.

In an embodiment, session management block 814A1 generates and processes duplicate dynamic rules. For example, as described earlier, data corresponding to each session is carried over a corresponding GTP tunnel between a set of network elements (e.g., between SGSN 230-1 and GGSN 240-1), with a set of tunnel endpoint identifiers (TEIDs) being allocated for the corresponding network elements in the GTP tunnel. When the session is terminated, a corresponding termination packet indicating the termination of the session is generated by one of the network elements in the GTP tunnel. The termination packet is processed by router controller 104 such that any corresponding dynamic rule is deleted in the dynamic GCL table 584 of the packet router 104.

However, in case the termination packet is lost in transit, the packet is not processed by router controller 104 and the corresponding dynamic rule is not deleted from dynamic GCL table 584. In such an event, if the same tunnel identifiers are reused by the network elements for a subsequent GTP tunnel, a duplicate dynamic rule (matching the existing dynamic rule) may be generated by session management block 814A, during processing of the GTP packet.

In such a case, if session management block 814A processes a subsequent GTP-C packet that generates a duplicate dynamic rule (i.e., the new dynamic rule matches an existing dynamic rule), then session management block 814A either deletes the newly generated duplicate dynamic rule (so that configuration block 815A does not program the duplicate rule into the dynamic GCL table 584 in the packet router 102), or replaces the existing dynamic rule with the new duplicate rule (i.e., updating the rule in the table 584).

The description is continued with respect to another aspect of the present disclosure.

14. Availability Status of Components in a Packet Router

It may be observed from the description above, that packet router 102 contains multiple components, which individually perform a similar function with respect to corresponding set of assigned packets. For example, multiple service instances (GVSI) are hosted on service card 506A (and other service cards), each responsible for processing a corresponding set of packets. Similarly, multiple output ports (130-1 to 130-P) are provided on egress card 508. The various components may communicate with each other based on the configuration/data specified in the various tables (shown in FIGS. 6A-6E) of packet router 102.

FIG. 11 depicts an example default configuration of the components in packet router 102. For illustration, it is assumed that there are only two service instances GVSI-1 and GVSI-2, only four output ports OP1-OP4, and the source and/or destination IP addresses each range from IP1 through IP8. All four output ports are accessible from each of GVSI-1 and GVSI-2.

GTP packets with IP addresses (both source and destination) ranging from IP1 through IP4 are assumed to be tagged in ingress card 502 to be sent to GVSI-1, while GTP packets with IP addresses ranging from IP4 through IP8 are tagged to be sent to GVSI-2. The default GCL table in GVSI-1 is assumed to map IP addresses IP1-IP2 to OP 1, and IP addresses IP3-IP4 to OP2, although ports OP3 and OP4 are also accessible from GVSI-1. The default GCL table in GVSI-2 is assumed to map IP addresses IP5-IP6 to OP 3, and IP addresses IP7-IP8 to OP4, although ports OP1 and OP2 are also accessible from GVSI-1. In operation, a GTP packet with tunnel end point address(es) with value IP5 is forwarded to GVSI-2 by whitelist card 504 (based on the tagging done by ingress card 502). GVSI-2 would forward the GTP packet to OP3. A GTP packet with tunnel end point addresses with value IP2 is forwarded to GVSI-1 by whitelist card 504. GVSI-1 would forward the GTP packet to OP2, and so on, based on the corresponding default GCL tables.

According to an aspect of the present disclosure, default forwarding rules associated with a component (such as service card/service instance) are re-assigned to other functioning components upon change in availability status such as failure, removal, and addition of components in packet router 102. Configuration block 815A performs such re-assigning with a view to balance the load among the remaining functioning components. Configuration block 815A can determine the load on a component by inspecting locally-stored data (e.g., which may be stored in memory 817A of FIG. 8) indicating availability of CAM space in the component. In other words, the number of rules stored in CAM space are assumed to reflect the corresponding load on the component.

For example, upon failure (for reasons such as malfunction and power-supply failure, which are not specifically manually instructed by a user) of a service card or a service instance within a service card, or if a user expressly indicates that a specific service instance not be used, configuration block 815A deletes the forwarding rules (default as well as dynamic entries) applied to the service instance, and assigns the deleted default and dynamic rules to another service instance that is functional by creating default and dynamic entries in that service instance. Similarly, on failure of an output port, configuration block 815A creates new entries in the default GCL table of the corresponding service instance(s) to now cause the service instance to forward GTP packets to another (functioning) output port. Such re-assigning may be done to balance the load across the remaining functioning components of packet router 102 (load balanced manner).

In one embodiment, configuration block 815A receives information indicating failure, or removal by a user, of components such as service cards, from packet router 102 via control port 563. Upon receipt of such 'failure' information (although the information could instead be related addition of a resource/component rather than failure), configuration block 815A operates to re-assign, in a load balanced manner, the rules in the failed component to other functioning components. Examples of instances when configuration block 815A re-assigns/updates rules in components of packet router 102 are briefly described next.

When a service instance fails (e.g., due to hardware failure), configuration block 815A performs the following operations:
- A. Moves, in a load balanced manner, default and dynamic rules currently contained in the failed service instance to default and dynamic tables (583 and 584) of functioning service instances;
- B. In entries in zoning table 580 of ingress card 502, replaces GVSI IDs (identifier of the service instance) of the failed service instance with GVSI IDs of a corresponding functioning service instance; and
- C. Deletes stored data (in memory 817A) associated with the failed service instance, including all default configuration rules for the failed service instance.

To illustrate, assuming GVSI-1 of FIG. 11 were to fail, configuration block 815A adds the entries in the default GCL table of GVSI-1 to the default GCL table of GVSI-2. Assuming, GVSI-1 had a dynamic GCL table as well, configuration block 815A either adds the entries of the dynamic GCL table of GVSI-1 to that (if existing) in GVSI-2, or creates a new dynamic GCL table in GVSI-2 with the entries in the dynamic GCL table of GVSI-1. Configuration block 815A also replaces the GVSI ID of GVSI-1 with GVSI ID of GVSI-2 in zoning table 580, such that a GTP packet would now always be routed to GVSI-2.

In operation, a GTP packet with tunnel end point addresses with value IP1 is forwarded to GVSI-2 (rather than GVSI-1) by whitelist card 504, with GVSI-2 then forwarding the GTP packet to OP1. A GTP packet with tunnel end point addresses with value IP4 is also forwarded to GVSI-2 by whitelist card 504, with GVSI-2 then forwarding the GTP packet to OP2, and so on. Assuming that two more GVSI instances had been present, configuration block 815A distributes the entries in the default GCL table of GVSI-1 across the default GCL tables of the other three GVSI instances in a load balanced manner (i.e., taking into account the current load on each instance). As noted above, configuration block 815A determines the load on each instance by inspecting locally-stored data indicating availability of CAM space in the default GCL tables of the corresponding service instances. Configuration block 815A also makes corresponding changes to zoning table in ingress card 502. Dynamic entries in GVSI-1 would similarly be distributed across the three remaining GVSI instances.

When the failed service instance is again available for operation, rules that were earlier applied to the service instance when the service instance was operational, may be re-applied by configuration block 815A to the now functioning service instance, while also deleting the re-applied rules from the other corresponding service instances, and making corresponding entry changes in zoning table 580 to include forwarding of packets to the now available service instance also. Accordingly, upon a service instance being detected to have failed, information indicating the specific rules then processed by the service instance, as well as the specific service instance to which each rule is re-allocated, may be stored in memory 817A of FIG. 8.

However, if the renewed availability of the service instance occurred after de-configuration (manual intervention instructing that the service instance is no longer to be used) of the service instance by an operator (rather than failure of the service instance), then configuration block 815A may not remap or load balance existing default rules to the new service instance, but merely programs new (as-yet un-assigned) rules to the new service instance.

As another example, if a service card itself is removed or de-configured by an operator, configuration block 815A distributes (for example, equally) the default rules configured on the removed service card among the remaining functioning service cards. Configuration block 815A may also update zoning table 580 to reflect the removal of the service card, i.e., stop forwarding packets to the removed service card, and instead to forward such packets to one or more of the functioning service cards.

As another example, if a new service card is added, configuration block 815A may not attempt to remap existing default rules in other service cards to the new service card. Instead, configuration block 815A programs the default GCL table of the new service card with rules containing new (as yet un-assigned) IP addresses of tunnel end points (e.g., GGSN, SGW) since the new card is the least loaded. Configuration block 815A may create new rules in zoning table 580 also to cause packet forwarding to the new service card.

As another example, when an output port fails (malfunctions or otherwise becomes unavailable due to reasons other than express administrator commands), configuration block 815A updates the default and dynamic rules in service instances that contain the failed output port as the destination port for packets, to now be forwarded to other functioning output ports. Configuration block 815A may perform such updating to distribute the forwarding of packets evenly to the functioning output ports, i.e., in a load-balanced manner. Configuration block 815A also changes entries in native-IP table (581) to reflect the failure (i.e., to cause the corresponding rules to direct incoming native IP packets to functioning output ports). The rules thus changed due to failure of an output port are marked as such in local memory 817A, including information indicating the now failed output port before the change to which all of the rules were pointing to, prior to the failure of the output port.

When operation of the failed output port is restored, configuration block 815A retrieves the rules that were mapped to the port before the failure of the output port occurred, and remaps the rules to the now functioning output port. Thus, configuration block 815A identifies (by inspecting the copy of rules stored in local memory 817A) entries in the default and dynamic GCL tables of service instances that were earlier changed to forward packets to other functioning output ports (rather than the failed output port), and now causes those entries to once again forward packets to the now-restored output port.

When a new output port is made available for operation by an operator, configuration block 815A programs the default GCL tables of service instances with as yet un-assigned rules, specifying the newly available output port as the destination for packets. Configuration block 815A may not attempt to remap existing default rules in service cards to the new output port, but may create corresponding new entries in native-IP table 581 to cause native-IP packets to be forwarded now to the new output port rather than the output port specified earlier in native-IP table 581.

As another example, when an egress card (e.g., 508) fails (malfunctions or otherwise becomes unavailable due to reasons other than express administrator commands), configuration block 815A updates the default and dynamic rules in service instances that contain output ports on the failed egress card as the destination port for packets, to now be forwarded to functioning output ports on other functioning egress cards. Configuration block 815A may perform such updating to distribute the forwarding of packets evenly to the functioning egress cards, i.e., in a load-balanced manner. When operation of the failed egress card is restored, configuration block 815A retrieves the rules that were mapped to the egress card before the failure of the egress card occurred, and remaps the rules to the now functioning egress card. Thus, configuration block 815A identifies (by inspecting the copy of rules stored in local memory 817A) entries in the default and dynamic GCL tables of service instances that were earlier changed to forward packets to other functioning output ports (and not output ports on the failed egress card), and now causes those entries to once again forward packets to the corresponding output ports of the now-restored egress card.

As another example, when a new egress card is added by an operator, configuration block 815A programs the default GCL tables of service instances with as yet un-assigned rules, specifying corresponding output ports on the new egress card as the destination for packets. Configuration block 815A may not attempt to remap existing default rules in service cards to the new egress card. Configuration block 815A may also create corresponding new entries in native-IP table 581 to cause native-IP packets to be forwarded now to output ports on the new egress card (rather than the output port specified earlier in native-IP table 581).

If control port 563 fails, then for the duration of such failure configuration block 815A cannot receive (from packet router 102) notifications of change in availability status (additions/removal, failure) of service instances/service cards and/or output ports/egress cards. When operation of control port 563 is restored, configuration block 815A gets an indication from packet router 102 (via control port 563) that control port 563 is now operational. In addition, packet router 102 also sends the 'current' (i.e., latest) state of all service instances/cards and output ports/egress cards to configuration block 815A via control port 563.

Configuration block 815A compares the difference between the latest state and the state before failure of control port 563 (which configuration block 815A maintains in memory 817A), and either adds new forwarding rules in newly available service instances/cards and/or output ports/egress cards, or re-assigns forwarding rules from now-unavailable service instances/cards and/or output ports/egress cards to functioning service instances/cards and/or output ports/egress cards in a load balanced manner. For example, if a new service card was added in the duration that control port 563 was non-operational, configuration block 815A adds as-yet unassigned forwarding rules to the new service card. On the other hand, if a service card had failed, configuration block 815A assigns rules earlier assigned to the now-failed service card to other functional service cards in a load balanced manner.

If service port 573 fails, session management block 814A cannot create entries in the dynamic GCL tables in service cards 506A-506N for the duration of such failure. Session management block 814A marks any unsuccessful attempts at creation of entries in the dynamic GCL tables. When operation of service port 573 is restored, session management block 814A performs creation of the hitherto unsuccessful entries (if any) in the dynamic GCL tables.

If mirror port 571 or learning port 561 fail, router controller 104 cannot receive mirrored GTP-C packets from whitelist card 504, or newly discovered packets from ingress card 502. Configuration block 518A cannot therefore perform discovery of IP addresses and/or session correlation of GTP packets as noted above for the duration of such failure. Configuration block 815A resumes discovery of IP addresses and session correlation operations (if any is required) once ports 561/571 resume operation.

In cases in which packet router 102 becomes non-operational (e.g., due to power-failure), then on resumption of operation of packet router 102, configuration block 815A reprograms (afresh) all rules in ingress card, service cards and egress cards as if network visibility system 100 had re-started. Similarly, on resumption of operation of router controller 104 after a failure, configuration block 815A programs all rules in ingress cards, service cards and egress cards, as if network visibility system 100 had re-started (re-initialized).

It should be appreciated that the features described above can be implemented in various embodiments as a desired combination of one or more of hardware, executable modules, and firmware. The description is continued with respect to an embodiment in which various features are operative when the instructions in the executable modules are executed.

15. Digital Processing System

Figure 12:
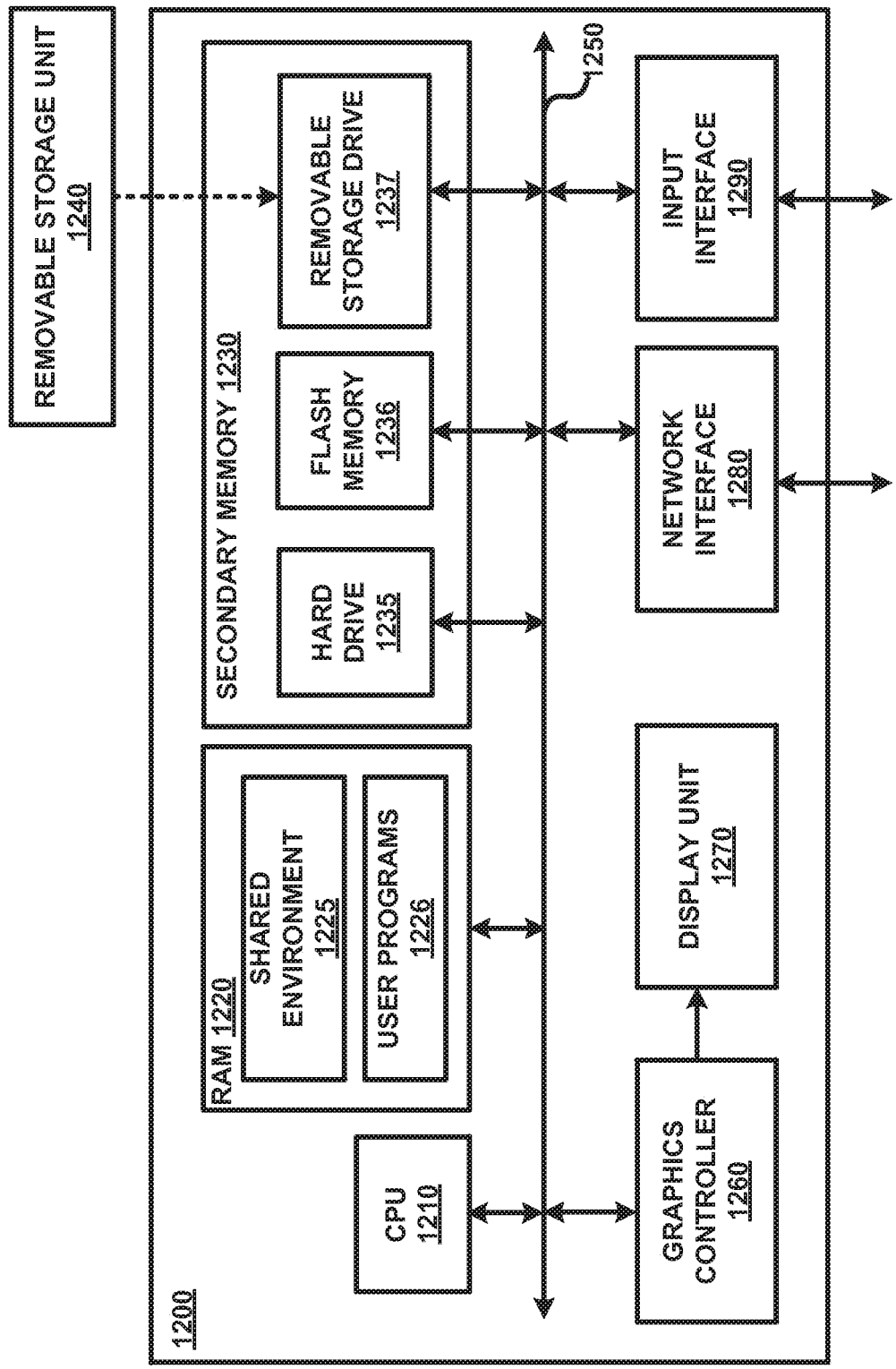
FIG. 12 is a block diagram illustrating the details of digital processing system in which several aspects of the present disclosure are operative by execution of appropriate executable modules.

FIG. 12 is a block diagram illustrating the details of digital processing system 1200 in which several aspects of the present disclosure are operative by execution of appropriate executable modules. Digital processing system 1200 corresponds to router controller 104.

Digital processing system 1200 may contain one or more processors (such as a central processing unit (CPU) 1210), random access memory (RAM) 1220, secondary memory 1230, graphics controller 1260, display unit 1270, network interface 1280, and input interface 1290. All the components except display unit 1270 may communicate with each other over communication path 1250, which may contain several buses as is well known in the relevant arts. The components of FIG. 12 are described below in further detail.

CPU 1210 may execute instructions stored in RAM 1220 to provide several features of the present disclosure. CPU 1210 may contain multiple processing units, with each processing unit (containing one or more processors) potentially being designed for a specific task. Alternatively, CPU 1210 may contain only a single general-purpose processing unit. RAM 1220 may receive instructions from secondary memory 1230 using communication path 1250. RAM 1220 is shown currently containing software instructions constituting shared environment 1225 and/or user programs 1226. Shared environment 1225 contains utilities shared by user programs, and such shared utilities include operating system, device drivers, virtual machines, and flow engines, which provide a (common) run time environment for execution of user programs 1226.

Graphics controller 1260 generates display signals (e.g., in RGB format) to display unit 1270 based on data/instructions received from CPU 1210. Display unit 1270 contains a display screen to display the images defined by the display signals. Input interface 1290 may correspond to a keyboard and a pointing device (e.g., touch-pad, mouse) that may be used to provide various desired inputs (such as user specified entries in configuration file 816A). Network interface 1280 provides connectivity to a network (e.g., using Internet Protocol), and may be used to communicate with other connected systems.

Secondary memory 1230 represents a non-transitory medium, which may store the data and software instructions (for example, for performing the steps of FIGS. 4A, 4B and 4C), to enable digital processing system 1200 to provide several features in accordance with the present disclosure. The code/instructions stored in secondary memory 1230 may either be copied to RAM 1220 prior to execution by CPU 1210 for higher execution speeds, or may be directly executed by CPU 1210.

Secondary memory 1230 may contain hard drive 1235, flash memory 1236, and removable storage drive 1237.

Some or all of the data and instructions may be provided on removable storage unit 1240, and the data and instructions may be read and provided by removable storage drive 1237 to CPU 1210. Removable storage unit 1240 may be implemented using medium and storage format compatible with removable storage drive 1237 such that removable storage drive 1237 can read the data and instructions. Thus, removable storage unit 1240 includes a computer readable (storage) medium having stored therein computer software and/or data. However, the computer (or machine, in general) readable medium can be in other forms (e.g., non-removable, random access).

In this document, the term "computer program product" is used to generally refer to removable storage unit 1240 or hard disk installed in hard drive 1235. These computer program products are means for providing software to digital processing system 1200. CPU 1210 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1230. Volatile media includes dynamic memory, such as RAM 1220. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1250. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

16. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

Appendix A

Detecting SGW—IP Addresses
  a) Any IP frame with Protocol number: 17 (UDP) AND Destination port: 2123 (GTPv2) AND Message Type: 33 (Create Session Response),
    Parse the IP address found in information element called F-TEID (IE Type 87). Interface Type=11 (S11/S4 SGW GTPC).
  b) Any IP frame with Protocol number: 17 (UDP) AND Destination port: 2123 (GTPv2) AND Message Type: 35 (Modify Bearer Response),
    Parse the IP address found in information element called F-TEID (IE Type 87). Interface Type=1 (S1U-SGW-GTPU).
  a) Any IP frame with Protocol number: 17 (UDP) AND Destination port: 2123 (GTPv2) AND Message Type: 166 (Create Indirect Data Forwarding Tunnel Response),
    Parse the IP address found in information element called F-TEID (IE Type 87). Interface Type=23 or 28 (SGW-GTPU).

Detecting PGW—IP Addresses
  b) Any IP frame with Protocol number: 17 (UDP) AND Destination port: 2123 (GTPv2) AND Message Type: 32 (Create Session Request),
    Parse the IP address found in information element called F-TEID (IE Type 87). Interface Type=7(S5/S8 PGW GTPC).
  c) Any IP frame with Protocol number: 17 (UDP) AND Destination port: 2123 (GTPv2) AND Message Type: 33 (Create Session Response),
    Parse the IP address found in information element called F-TEID (IE Type 87). Interface Type=7 (S5/S8 PGW GTPC).

Detecting MME—IP Addresses
  a) Destination IP Field denotes MME IP address; whose IP Packet with Protocol Number: 132 (SCTP) and Destination port: 36412
  b) Source IP Field denotes MME IP address; whose IP packet with Protocol Number: 132 (SCTP) and Source Port=36412
  c) Any IP frame with Protocol number: 17 (UDP) AND Destination port: 2123 (GTPv2) AND Message Type: 32 (Create Session Request),
    Parse the IP address found in information element called F-TEID (IE Type 87). Interface Type=10 (MME-GTPC).
  d) Source IP denotes MME IP address; whose IP frame with Protocol number: 132 (SCTP) AND Destination/Source port is 3868 (DIAMETER) AND Application ID: 16777251 (S6a/S6d) AND Command Code: 318 (3GPP Authentication Information) AND AVP Code: 1 (User-Name) is present
e) Destination IP denotes MME IP address; whose IP frame with Protocol number: 132 (SCTP) AND Destination/Source port is 3868 (DIAMETER) AND Application ID: 16777251 (S6a/S6d) AND Command Code: 318 (3GPP Authentication Information) AND AVP Code: 268 (Result Code) is present
f) Source IP denotes MME IP address; whose IP frame with Protocol number: 132 (SCTP) AND Destination/Source port is 3868 (DIAMETER) AND Application ID: 16777251 (S6a/S6d) AND Command Code: 316 (3GPP Update Location) AND AVP Code: 1 (User-Name) is present
g) Destination IP denotes MME IP address; whose IP frame with Protocol number: 132 (SCTP) AND Destination/Source port is 3868 (DIAMETER) AND Application ID: 16777251 (S6a/S6d) AND Command Code: 316 (3GPP Update Location) AND AVP Code: 268 (Result Code) is present
h) Source IP denotes MME IP address; whose IP frame with Protocol number: 132 (SCTP) AND Destination/Source port is 3868 (DIAMETER) AND Application ID: 16777251 (S6a/S6d) AND Command Code: 317 (3GPP Cancel Location) AND AVP Code: 1 (User-Name) is present
i) Destination IP denotes MME IP address; whose IP frame with Protocol number: 132 (SCTP) AND Destination/Source port is 3868 (DIAMETER) AND Application ID: 16777251 (S6a/S6d) AND Command Code: 317 (3GPP Cancel Location) AND AVP Code: 268 (Result Code) is present
j) Source IP denotes MME IP address; whose IP frame with Protocol number: 132 (SCTP) AND Destination/Source port is 3868 (DIAMETER) AND Application ID: 16777251 (S6a/S6d) AND Command Code: 321 (3GPP Purge UE) AND AVP Code: 1 (User-Name) is present
k) Destination IP denotes MME IP address; whose IP frame with Protocol number: 132 (SCTP) AND Destination/Source port is 3868 (DIAMETER) AND Application ID: 16777251 (S6a/S6d) AND Command Code: 321 (3GPP Cancel Location) AND AVP Code: 268 (Result Code) is present
l) Source IP denotes MME IP address; whose IP frame with Protocol number: 132 (SCTP) AND Destination/Source port is 3868 (DIAMETER) AND Application ID: 16777251 (S6a/S6d) AND Command Code: 319 (3GPP Insert Subscriber Data) AND AVP Code: 1 (User-Name) is present
m) Destination IP denotes MME IP address; whose IP frame with Protocol number: 132 (SCTP) AND Destination/Source port is 3868 (DIAMETER) AND Application ID: 16777251 (S6a/S6d) AND Command Code: 319 (3GPP Insert Subscriber Data) AND AVP Code: 268 (Result Code) is present
n) Source IP denotes MME IP address; whose IP frame with Protocol number: 132 (SCTP) AND Destination/Source port is 3868 (DIAMETER) AND Application ID: 16777251 (S6a/S6d) AND Command Code: 322 (3GPP Reset) AND AVP Code: 1 (User-Name) is present
o) Destination IP denotes MME IP address; whose IP frame with Protocol number: 132 (SCTP) AND Destination/Source port is 3868 (DIAMETER) AND Application ID: 16777251 (S6a/S6d) AND Command Code: 322 (3GPP Reset) AND AVP Code: 268 (Result Code) is present
p) Source IP denotes MME IP address; whose IP frame with Protocol number: 132 (SCTP) AND Destination/Source port is 3868 (DIAMETER) AND Application ID: 16777251 (S6a/S6d) AND Command Code: 323 (3GPP Notify) AND AVP Code: 1 (User-Name) is present
q) Destination IP denotes MME IP address; whose IP frame with Protocol number: 132 (SCTP) AND Destination/Source port is 3868 (DIAMETER) AND Application ID: 16777251 (S6a/S6d) AND Command Code: 323 (3GPP Notify) AND AVP Code: 268 (Result Code) is present
r) Source IP denotes MME IP address; whose IP frame with Protocol number: 132 (SCTP) AND Destination/Source port is 3868 (DIAMETER) AND Application ID: 16777251 (S6a/S6d) AND Command Code: 324 (3GPP ME Identity Check) AND AVP Code: 1 (User-Name) is present
s) Destination IP denotes MME IP address; whose IP frame with Protocol number: 132 (SCTP) AND Destination/Source port is 3868 (DIAMETER) AND Application ID: 16777251 (S6a/S6d) AND Command Code: 324 (3GPP ME Identity Check) AND AVP Code: 268 (Result Code) is present Detecting HSS—IP Addresses
a) Destination IP denotes HSS IP address; whose IP frame with Protocol number: 132 (SCTP) AND Destination/Source port is 3868 (DIAMETER) AND Application ID: 16777251 (S6a/S6d) AND Command Code: 318 (3GPP Authentication Information) AND AVP Code: 1 (User-Name) is present.
b) Source IP denotes HSS IP address; whose IP frame with Protocol number: 132 (SCTP) AND Destination/Source port is 3868 (DIAMETER) AND Application ID: 16777251 (S6a/S6d) AND Command Code: 318 (3GPP Authentication Information) AND AVP Code: 268 (Result Code) is present.
c) Destination IP denotes HSS IP address; whose IP frame with Protocol number: 132 (SCTP) AND Destination/Source port is 3868 (DIAMETER) AND Application ID: 16777251 (S6a/S6d) AND Command Code: 316 (3GPP Update Location) AND AVP Code: 1 (User-Name) is present
d) Source IP denotes HSS IP address; whose IP frame with Protocol number: 132 (SCTP) AND Destination/Source port is 3868 (DIAMETER) AND Application ID: 16777251 (S6a/S6d) AND Command Code: 316 (3GPP Update Location) AND AVP Code: 268 (Result Code) is present.
e) Destination IP denotes HSS IP address; whose IP frame with Protocol number: 132 (SCTP) AND Destination/Source port is 3868 (DIAMETER) AND Application ID: 16777251 (S6a/S6d) AND Command Code: 317 (3GPP Cancel Location) AND AVP Code: 1 (User-Name) is present.
f) Source IP denotes HSS IP address; whose IP frame with Protocol number: 132 (SCTP) AND Destination/Source port is 3868 (DIAMETER) AND Application ID: 16777251 (S6a/S6d) AND Command Code: 317 (3GPP Cancel Location) AND AVP Code: 268 (Result Code) is present.
g) Destination IP denotes HSS IP address; whose IP frame with Protocol number: 132 (SCTP) AND Destination/Source port is 3868 (DIAMETER) AND Application ID: 16777251 (S6a/S6d) AND Command Code: 321 (3GPP Purge UE) AND AVP Code: 1 (User-Name) is present h) Source IP denotes HSS IP address; whose IP frame with Protocol number: 132 (SCTP) AND Destination/Source port is 3868 (DIAMETER) AND Application ID: 16777251 (S6a/S6d) AND Command Code: 321 (3GPP Cancel Location) AND AVP Code: 268 (Result Code) is present.

i) Destination IP denotes HSS IP address; whose IP frame with Protocol number: 132 (SCTP) AND Destination/Source port is 3868 (DIAMETER) AND Application ID: 16777251 (S6a/S6d) AND Command Code: 319 (3GPP Insert Subscriber Data) AND AVP Code: 1 (User-Name) is present.

j) Source IP denotes HSS IP address; whose IP frame with Protocol number: 132 (SCTP) AND Destination/Source port is 3868 (DIAMETER) AND Application ID: 16777251 (S6a/S6d) AND Command Code: 319 (3GPP Insert Subscriber Data) AND AVP Code: 268 (Result Code) is present.

k) Destination IP denotes HSS IP address; whose IP frame with Protocol number: 132 (SCTP) AND Destination/Source port is 3868 (DIAMETER) AND Application ID: 16777251 (S6a/S6d) AND Command Code: 322 (3GPP Reset) AND AVP Code: 1 (User-Name) is present.

l) Source IP denotes HSS IP address; whose IP frame with Protocol number: 132 (SCTP) AND Destination/Source port is 3868 (DIAMETER) AND Application ID: 16777251 (S6a/S6d) AND Command Code: 322 (3GPP Reset) AND AVP Code: 268 (Result Code) is present.

m) Destination IP denotes HSS IP address; whose IP frame with Protocol number: 132 (SCTP) AND Destination/Source port is 3868 (DIAMETER) AND Application ID: 16777251 (S6a/S6d) AND Command Code: 323 (3GPP Notify) AND AVP Code: 1 (User-Name) is present.

n) Source IP denotes HSS IP address; whose IP frame with Protocol number: 132 (SCTP) AND Destination/Source port is 3868 (DIAMETER) AND Application ID: 16777251 (S6a/S6d) AND Command Code: 323 (3GPP Notify) AND AVP Code: 268 (Result Code) is present.

o) Destination IP denotes HSS IP address; whose IP frame with Protocol number: 132 (SCTP) AND Destination/Source port is 3868 (DIAMETER) AND Application ID: 16777251 (S6a/S6d) AND Command Code: 324 (3GPP ME Identity Check) AND AVP Code: 1 (User-Name) is present.

p) Source IP denotes HSS IP address; whose IP frame with Protocol number: 132 (SCTP) AND Destination/Source port is 3868 (DIAMETER) AND Application ID: 16777251 (S6a/S6d) AND Command Code: 324 (3GPP ME Identity Check) AND AVP Code: 268 (Result Code) is present.

Detecting eNodeB—IP Addresses a) Source IP Field denotes eNodeB IP addresses; whose IP Packet with Protocol Number: 132 (SCTP) And Destination port: 36412 b) Destination IP Field denotes eNodeB IP addresses; whose IP Packet with Protocol Number: 132 (SCTP) And Source port: 36412 c) Any IP frame with Protocol number: 17 (UDP) AND Destination port: 2123 (GTPv2) AND Message Type: 34 (Modify Bearer Request), Parse the IP address found in information element called F-TEID (IE Type 87). Interface Type=0 (eNodeB-GTPU).

d) Any IP frame with Protocol number: 17 (UDP) AND Destination port: 2123 (GTPv2) AND Message Type: 166 (Create Indirect Data Forwarding Tunnel Request), Parse the IP address found in information element called F-TEID (IE Type 87). Interface Type=19 or 20 (eNodeB-GTPU).

Detecting SGSN—IP Addresses a) Any IP frame with Protocol number: 17 (UDP) AND Destination port: 2123 (GTPv1) AND Message Type: 16 (Create PDP Context Request),
Parse the IP address found in information element called GSN IP (IE Type 85).

b) Any IP frame with Protocol number: 17 (UDP) AND Destination port: 2123 (GTPv1) AND Message Type: 18 (Update PDP Context Request) and SGSN Initiated Request
Parse the IP address found in information element called GSN IP (IE Type 85).

Detecting GGSN—IP Addresses a) Any IP frame with Protocol number: 17 (UDP) AND Destination port: 2123 (GTPv1) AND Message Type: 17 (Create PDP Context Response),
Parse the IP address found in information element called GSN IP (IE Type 85).

b) Any IP frame with Protocol number: 17 (UDP) AND Destination port: 2123 (GTPv1) AND Message Type: 18 (Update PDP Context Response) and GGSN Initiated Response
Parse the IP address found in information element called GSN IP (IE Type 85).

Detecting RNC—IP Addresses a) Any IP frame with Protocol number: 17 (UDP) AND Destination port: 2123 (GTPv1) AND Message Type: 18 (Update PDP Context Request) and Direct tunnel SGSN Initiated Request.
Parse the IP address found in information element called GSN IP (IE Type 85).

What is claimed is:

1. A router controller, comprising:
a switch configured to receive a plurality of packets, wherein the switch comprises:
a switch port configured to receive the plurality of packets from a packet router;
a switch input port; and
a switch output port;
a plurality of controller blocks configured to process the plurality of packets, wherein the plurality of controller blocks is configured to receive the plurality of packets from the switch output port;
wherein, in processing the plurality of packets, each controller block of the plurality of controller blocks is further configured to:
determine, based on the plurality of packets, a first output port of the packet router based on a first destination address of a control session and a second output port of the packet router based on a second destination address of a data session;
generate, based on the determination of the first output port, a forwarding rule for the packet router to route the plurality of packets to the first output port or the second output port;
configure the packet router by programming the forwarding rule into a load-sharing component of the packet router;

receive an availability status of another component in the packet router; and update the forwarding rule based on the availability status; and wherein the plurality of controller blocks comprise a master controller block and one or more slave controller blocks, wherein the master controller block is configured to modify the packet router based on an additional forwarding rule, wherein each of the master controller block and the one or more slave controller blocks comprises a synchronization block, wherein each synchronization block is configured to synchronize information on a portion of the forwarding rule and the additional forwarding rule provided by a corresponding controller block with that of any remaining controller blocks such that each of the plurality of controller blocks has a same view of the forwarding rule and the additional forwarding rule, and wherein each controller block with the same view of the forwarding rule and the additional forwarding rule is configured to process the plurality of packets.

2. The router controller of claim 1, wherein each controller block is configured to forward the forwarding rule to the switch via the switch input port, and wherein the switch is configured to forward the forwarding rule to the packet router via the switch port prior to the plurality of controller blocks receiving the availability status and to forward the updated forwarding rule subsequent to the plurality of controller blocks receiving the availability status.

3. The router controller of claim 1, wherein the switch comprises a plurality of distribution rules for distributing the plurality of packets to the plurality of controller blocks, and wherein each of the plurality of packets is an Internet Protocol (IP) packet and each of the plurality of distribution rules is based on an IP address in a header of the IP packets.

4. The router controller of claim 1, wherein the master controller block is configured to retrieve the additional forwarding rule from a configuration file before modifying the packet router.

5. The router controller of claim 1, further comprising a plurality of passive controller blocks corresponding to the plurality of controller blocks, wherein each of the controller block and the corresponding passive controller block are communicatively coupled to the switch input port of the switch by a same path, wherein in response to the controller block being non-operational, the corresponding passive controller block is configured to transition to an operational state, wherein the switch is configured to continue to distribute packets without modifying the distribution rules in the switch during the transition of the corresponding passive controller block to the operational state.

6. The router controller of claim 1, wherein the forwarding rule is configured to update at least one of a plurality of tables of the packet router.

7. The router controller of claim 1, wherein the forwarding rule and the updated forwarding rule are based on one or more of:
a control protocol type;
a message type;
an interface type;
an application ID;
a source IP address and a source IP port; and
a destination IP address and a destination IP port.

8. The router controller of claim 1, wherein the forwarding rule and the updated forwarding rule are based on an International Mobile Subscriber Identity (IMSI) of a user equipment (UE) configured to route the plurality of packets from the UE to the first or second output port on the packet router.

9. A network system, comprising:
a plurality of analytic servers;
a packet router configured to receive packets and to forward the packets to one of the plurality of analytic servers based on a forwarding rule; and
a router controller, comprising:
a switch configured to receive a copy of a plurality of packets intercepted at a plurality of network tap points, wherein the switch comprises:
a switch port configured to receive the copy of the plurality of packets from the packet router;
a switch input port; and
a switch output port; and
a plurality of controller blocks configured to process the copy of the plurality of packets,
wherein the switch is configured, via the switch output port, to distribute the copy of the plurality of packets to the plurality of controller blocks, and
wherein each controller block of the plurality of controller blocks is configured to:
determine a first output port of the packet router based on a first destination address of a control session and a second output port of the packet router based on a second destination address of a data session;
generate the forwarding rule for the packet router to route the plurality of packets to the first output port or the second output port;
configure the packet router by programming the forwarding rule into a load-sharing component of the packet router; and
forward an updated forwarding rule to the switch via the switch input port, wherein the switch is further configured to forward the updated forwarding rule to the packet router via the switch port; and
wherein the plurality of controller blocks comprise a master controller block and one or more slave controller blocks, wherein the master controller block is configured to modify the packet router based on an additional forwarding rule,
wherein each of the master controller block and the one or more slave controller blocks comprises a synchronization block configured to synchronize information on a portion of the forwarding rule and the additional forwarding rule provided by a corresponding controller block with that of any remaining controller blocks such that each of the plurality of controller blocks has a same view of the forwarding rule and the additional forwarding rule, and
wherein each controller block with the same view of the forwarding rule and the additional forwarding rule is configured to process the plurality of packets.

10. The network system of claim 9, wherein the switch comprises a plurality of distribution rules for distributing the plurality of packets to the plurality of controller blocks,
wherein each of the plurality of packets is an Internet Protocol (IP) packet and each of the plurality of distribution rules is based on an IP address in a header of the IP packets.

11. The network system of claim 9, wherein the forwarding rule and the updated forwarding rule are based on one or more of:
a control protocol type;
a message type;

an interface type;
an application ID;
a source IP address and a source IP port; and
a destination IP address and a destination IP port.

12. The network system of claim 9, wherein the packets are routed to the first output port or the second output port based on an International Mobile Subscriber Identity (IMSI) of user equipment (UE).

13. A method, comprising:
receiving, via a switch port of a switch, a plurality of packets from a packet router;
distributing, via a switch output port of the switch, the plurality of packets to a plurality of controller blocks, wherein the plurality of controller blocks comprise a master controller block and one or more slave controller blocks, and wherein the method further comprises modifying, with the master controller block, the packet router based on an additional forwarding rule and wherein each of the master controller block and the one or more slave controller blocks comprises a synchronization block;
determining, based on the plurality of packets, a first output port of the packet router based on a first destination address of a control session and a second output port of the packet router based on a second destination address of a data session;
in response to a determination that the first output port and the second output port are two different ports, generating a forwarding rule used to route the plurality of packets of the control session and the data session to the first output port or the second output port;
configuring the packet router by programming the forwarding rule into a load-sharing component of the packet router;
receiving an availability status of another component in the packet router;
updating the forwarding rule based on the availability status; and
synchronizing, with the synchronization block, information on a portion of the forwarding rule and the additional forwarding rule provided by a corresponding controller block with that of any remaining controller blocks such that each of the plurality of controller blocks has a same view of the forwarding rule and the additional forwarding rule,
wherein each controller block with the same view of the forwarding rule and the additional forwarding rule is configured to process the plurality of packets.

14. The method of claim 13, wherein the plurality of packets are a copy of a plurality of packets from a user equipment.

15. The method of claim 13, wherein the plurality of packets are packets intercepted from at least one tap point in a network path from a user equipment to a core network.

16. The method of claim 13, wherein the forwarding rule and the updated forwarding rule are based on one or more of a control protocol type, a message type, an interface type, and an application ID.

* * * * *